US009641047B2

(12) United States Patent
Collett et al.

(10) Patent No.: US 9,641,047 B2
(45) Date of Patent: May 2, 2017

(54) AUXILIARY POWER MODULE

(71) Applicant: Parker-Hannifin Corporation, Cleveland, OH (US)

(72) Inventors: Raymond E. Collett, Put in Bay, OH (US); Hao Zhang, Twinsburg, OH (US); Rajneesh Kumar, Mayfield Heights, OH (US)

(73) Assignee: Parker-Hannifan Corporation, Cleveland, OH (US)

( * ) Notice: Subject to any disclaimer, the term of this patent is extended or adjusted under 35 U.S.C. 154(b) by 27 days.

(21) Appl. No.: 14/177,465

(22) Filed: Feb. 11, 2014

(65) Prior Publication Data

US 2014/0225374 A1 Aug. 14, 2014

Related U.S. Application Data

(60) Provisional application No. 61/763,200, filed on Feb. 11, 2013, provisional application No. 61/914,599, filed on Dec. 11, 2013, provisional application No. 61/914,649, filed on Dec. 11, 2013, provisional application No. 61/914,715, filed on Dec. 11, 2013.

(51) Int. Cl.
*H02K 7/18* (2006.01)
*H02P 9/06* (2006.01)
*B60L 11/14* (2006.01)

(52) U.S. Cl.
CPC ............ *H02K 7/1807* (2013.01); *B60L 11/14* (2013.01)

(58) Field of Classification Search
CPC .............................. H02K 7/1807; B60L 11/14
USPC .......................................................... 290/1 A
See application file for complete search history.

(56) References Cited

U.S. PATENT DOCUMENTS

| | | | | |
|---|---|---|---|---|
| 2,898,542 A | * | 8/1959 | Cholick et al. ................. | 322/90 |
| 3,883,794 A | * | 5/1975 | Sivley ............................. | 322/41 |
| 5,040,615 A | * | 8/1991 | Fletcher ......................... | 172/47 |
| 5,332,053 A | * | 7/1994 | Vachon .................. | A01B 63/00 |
| | | | | 180/306 |
| 5,809,779 A | * | 9/1998 | Bruso ............................ | 60/458 |
| 6,157,175 A | * | 12/2000 | Morinigo et al. .............. | 322/28 |
| 6,675,562 B2 | * | 1/2004 | Lawrence .......................... | 56/2 |
| 7,053,498 B1 | | 5/2006 | Boisvert et al. | |
| 7,459,800 B2 | | 12/2008 | Boisvert et al. | |
| 7,759,811 B2 | | 7/2010 | Boisvert et al. | |
| 7,861,537 B2 | * | 1/2011 | Givens ........................... | 60/626 |
| 8,269,359 B2 | | 9/2012 | Boisvert et al. | |

(Continued)

*Primary Examiner* — Tulsidas C Patel
*Assistant Examiner* — Viet Nguyen
(74) *Attorney, Agent, or Firm* — Renner, Otto, Boisselle & Sklar, LLP

(57) ABSTRACT

Provided is an auxiliary power module removably connectable to a mobile platform, such as a municipal vehicle having a prime mover mounted thereon for powering the auxiliary power module. The auxiliary power module includes at least one auxiliary power module, such as a generator, at least one hydraulic motor mechanically connected to the generator for driving the generator, and a fluid connector fluidly connected to the hydraulic motor and configured to mate with a coupler to fluidly connect the hydraulic motor to a hydraulic pump on the mobile platform. When the auxiliary power module is connected to the municipal vehicle, the existing vehicle hydraulic circuit may be used with the auxiliary power module to provide output power from the generator during emergency and disaster situations.

20 Claims, 19 Drawing Sheets

(56) References Cited

U.S. PATENT DOCUMENTS

| | | |
|---|---|---|
| 8,269,360 B2 | 9/2012 | Boisvert et al. |
| 8,276,831 B2 | 10/2012 | Rutherford |
| 2005/0184528 A1* | 8/2005 | Storm et al. ................ 290/40 C |
| 2010/0097040 A1* | 4/2010 | Boisvert et al. ................ 322/40 |
| 2011/0036651 A1* | 2/2011 | Majkrzak ............ F16H 61/4078 |
| | | 180/53.4 |
| 2011/0226539 A1 | 9/2011 | Huss et al. |
| 2014/0225374 A1 | 8/2014 | Collett et al. |

\* cited by examiner

AUXILIARY POWER MODULE

RELATED APPLICATIONS

This application claims the benefit of U.S. Provisional Application No. 61/763,200 filed Feb. 11, 2013, U.S. Provisional Application No. 61/914,599 filed Dec. 11, 2013, U.S. Provisional Application No. 61/914,649 filed Dec. 11, 2013, and U.S. Provisional Application No. 61/914,715 filed Dec. 11, 2013, which are hereby incorporated herein by reference.

FIELD OF INVENTION

The present invention relates generally to auxiliary power modules, and more particularly to auxiliary power modules for municipal vehicles.

BACKGROUND

Power take-off units are mechanical devices that are used in conjunction with sources of rotational energy, such as vehicle engines and transmissions, for selectively providing power to one or more rotatably driven accessories. For example, power take-off units are commonly used in a variety of industrial and agricultural vehicles for operating hydraulic pumps that, in turn, operate hydraulically driven accessories, such as plows, trash compactors, lifting mechanisms, winches, and the like. Power take-off units may also be used to connect the vehicle engines and transmission to an auxiliary device, such as a generator.

SUMMARY OF INVENTION

The present invention provides an auxiliary power module removably connectable to a mobile platform, such as a municipal vehicle having a prime mover mounted thereon for powering the auxiliary power module. The auxiliary power module includes at least one auxiliary power module, such as a generator, at least one hydraulic motor mechanically connected to the generator for driving the generator, and a fluid connector fluidly connected to the hydraulic motor and configured to mate with a fluid connector to fluidly connect the hydraulic motor to a hydraulic pump on the mobile platform. When the auxiliary power module is connected to the municipal vehicle, the existing vehicle hydraulic circuit may be used with the auxiliary power module to provide output power from the generator during emergency and disaster situations.

According to one aspect of the invention, an auxiliary power module is provided that is removably connectable to a mobile platform to be powered by a prime mover mounted on the platform. The auxiliary power module includes a housing, at least one auxiliary power device contained within the housing, at least one hydraulic motor contained within the housing and mechanically connected to the auxiliary power device for driving the auxiliary power device, and a fluid connector fluidly connected to the hydraulic motor and configured to mate with a fluid connector to fluidly connect the hydraulic motor to a hydraulic pump on the mobile platform.

The auxiliary power module may further include a cradle supporting the housing and configured to mate with a mounting system on the mobile platform.

The auxiliary power module may further include a mounting bracket configured to be coupled to the mobile platform and to the cradle to secure the power module to the mobile platform.

The mounting bracket may include at least two channels for mating with corresponding protrusions on the cradle.

The auxiliary power module may further include a first lock member coupled to the mounting bracket and protrusions and a second lock member coupled to the mounting bracket and protrusions that secure the cradle to the mounting bracket.

The cradle may include a base supporting a bottom of the housing, a rear portion projecting upward from the base, and a top portion extending from the rear portion parallel to the base, and wherein the rear portion of the cradle is coupled to the mounting bracket.

The auxiliary power module may further include a flow control valve for controlling the flow rate of the fluid entering the motor.

The auxiliary power module may further include a heat exchanger connected to the motor through a hydraulic circuit.

The auxiliary power module may further include a fan driven by the motor, wherein the fan is configured to blow air over the heat exchanger to cool the fluid in the hydraulic circuit.

The auxiliary power module may further include a controller configured to control speed of the prime mover powering the auxiliary power module, control displacement of a pump supplying fluid to the motor, and/or control one or more flow control valves for controlling flow of fluid to the motor and/or auxiliary power device.

The auxiliary power module may further include a protective barrier at least partially surrounding the auxiliary power device for protecting the auxiliary power device from impact during storage/transportation.

The auxiliary power module may further include one or more guide rails extending vertically from the housing.

The auxiliary power device may include a voltage selector for switching among multiple voltage levels.

The auxiliary power module may further include a fire suppression system contained within the housing.

The auxiliary power module may further include a connector for receiving an electrical umbilical cable connected to mobile platform, the connector serving as a single point of connection for auxiliary power device control, fault diagnostic and handling, start/stop control, and/or two way communication between the mobile platform and the auxiliary power device.

The auxiliary power device may be a generator.

According to another aspect of the invention, a power source may be provided that includes a prime mover mounted on a mobile platform, a hydraulic pump driven by the prime mover, a quick connect coupler fluidly connected to the hydraulic pump, a hose having first and second ends and a quick connect coupler on the first end for mating with the quick connect coupler connected to the pump, and an auxiliary power module removably connected to the mobile platform, the auxiliary power module including a hydraulic motor, a generator mechanically driven by the hydraulic motor, and a fluid connector fluidly connected to the hydraulic motor through a hydraulic circuit and configured to mate with a fluid connector on the second end of the hose to fluidly connect the hydraulic motor to the hydraulic pump.

The power source may further include a mounting system mounted on the mobile platform and a cradle supporting the auxiliary power module, wherein the cradle is configured to mate with the mounting system on the mobile platform.

The power source may further include a mounting bracket coupled to the cradle and configured to be coupled to the mobile platform to secure the auxiliary power module to the mobile platform.

The mounting bracket may include at least two channels that mate with corresponding protrusions on the cradle.

The power source may further include a first lock member coupled to the mounting bracket and protrusions and a second lock member coupled to the mounting bracket and protrusions that secure the cradle to the mounting bracket.

The power source may further include a transmission for transferring power from the prime mover and a power take-off connected to the transmission and connectable to the hydraulic pump to transfer the power to the hydraulic pump.

The power source may further include a power take-off connected to the prime mover and connectable to the hydraulic pump to transfer power from the prime mover to the hydraulic pump.

The auxiliary power module may further include an accumulator fluidly connected to the hydraulic circuit.

The first and/or second quick connect couplers may include one or more sensors for sensing if the couplers are fluidly connected.

The power source may further include a an electrical umbilical cable connecting the generator and a control on the mobile platform, the connector serving as a single point of connection for generator control, fault diagnostic and handling, start/stop control, and/or two way communication between the mobile platform and the generator.

The power source may further include a body hydraulic on the mobile platform which is driven by the hydraulic pump.

According to still another aspect of the invention, an auxiliary power module may be provided that is removably connectable to a mobile platform to be powered by a prime mover mounted on the platform. The auxiliary power module includes a housing, at least one generator contained within the housing, at least one hydraulic pump contained within a housing and configured to be driven by the prime mover, and at least one hydraulic motor contained within the housing, fluidly connected to the hydraulic pump through a hydraulic circuit, and mechanically connected to the generator for driving the generator.

The auxiliary power module may further include a controller configured to control speed of the prime mover powering the auxiliary power module, control displacement of the pump, and/or control one or more flow control valves for controlling flow of fluid to the motor and/or generator.

According to yet another aspect of the invention, an auxiliary power system is provided that includes a vehicle including a prime mover, a hydraulic pump driven by the prime mover, and an auxiliary mounting device coupled to a front of the vehicle, and an auxiliary power module removably connected to the auxiliary mounting device, the auxiliary power module including a hydraulic motor fluidly connected to the hydraulic pump through a hydraulic circuit, and a generator mechanically driven by the hydraulic motor.

The auxiliary mounting device may be a snow plow mount.

The foregoing and other features of the invention are hereinafter described in greater detail with reference to the accompanying drawings.

DETAILED DESCRIPTION

The principles of the present invention have particular application to auxiliary power devices, such as generators, pumps, etc. that utilize hydraulic or electric power on a vehicle, such as a municipal vehicle, and thus will be described below chiefly in this context. It will of course be appreciated, and also understood, that the principles of the invention may be useful in other applications where auxiliary power is provided.

Figure 1:
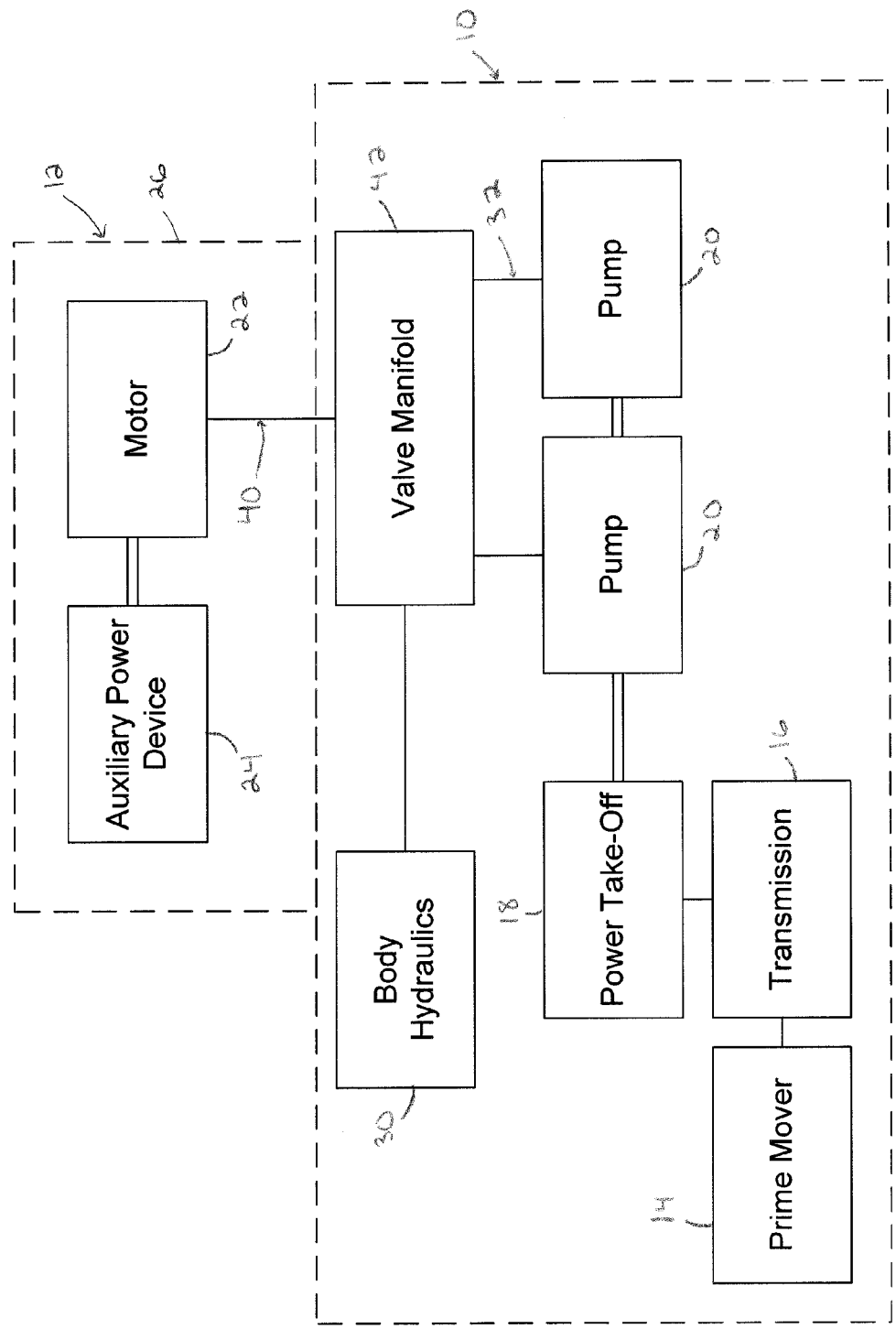
FIG. 1 is a schematic diagram of a vehicle and exemplary auxiliary power module according to the invention.

Turning now in detail to the drawings and initially to FIG. 1, a mobile platform 10, such as a vehicle, is shown connected to an auxiliary power module 12. The mobile platform 10 includes a prime mover 14, such as an engine or electric motor, a transmission 16 for transferring power from the prime mover 14, a power take-off 18 connected to the transmission 16, and one or more hydraulic pumps 20, such as a gear pump, a vane pump, a piston pump, etc. that are driven by energy from the prime mover 14 through the transmission 16 and power take-off 18. The auxiliary power module 12 includes a hydraulic motor 22, such as a gear motor, vane motor, piston motor, etc., an auxiliary power device 24, such as a generator, such as an AC synchronous or a DC generator with a DC/AC inverter onboard to power the devices/loads, a pump supplying flow to an end effector, a leaf blower/vacuum/fan, or other hydraulic element mechanically driven by the hydraulic motor 22, and a housing 26 containing the hydraulic motor 22 and the auxiliary power device 24 and serving as a dust and moisture cover.

During typical operation of the vehicle, the hydraulic pumps 20 are fluidly connected to one or more body hydraulics 30, such as a refuse compactor on a municipal refuse vehicle, through a body hydraulics circuit 32. The hydraulic pumps 20 supply hydraulic fluid through the body hydraulics circuit 32 to the body hydraulics 30 and/or other suitable hydraulic on the vehicle 10 for work or propulsion functions during typical operation.

During atypical operation, such as during emergency and disaster situations, the hydraulic pumps 20 can be fluidly disconnected from the body hydraulics 30 and fluidly connected to the hydraulic motor 22 through an auxiliary hydraulic circuit 40, which may be an open loop or closed loop circuit. A filtration loop may be provided to circulate flow to a reservoir in a closed loop or to a discharge side of the motor in an open loop. The hydraulic pumps 20 pressurize the hydraulic fluid entering the hydraulic motor 22, which converts the hydraulic energy into mechanical energy to drive the auxiliary power device 24. In this way, the vehicle 10 may provide output power during emergency and disaster situations using the existing vehicle hydraulic circuit 32 and pumps 20. Vehicle movement may be isolated or blocked during atypical operation, for example by placing the vehicle 10 in park and/or engaging an emergency brake.

A valve manifold 42 may be provided between the outlet of the hydraulic pumps 20 and the hydraulic motor 22 to isolate the fluid in the body hydraulics circuit 32 from the auxiliary hydraulic circuit 40 during typical operation. The valve manifold 42 may also be provided between the outlet of the hydraulic pumps 20 and the body hydraulics 30 to isolate the body hydraulics 30 from the fluid in the body hydraulics circuit 32 during atypical operation. This valve manifold 42 is configured to manage the engagement between the hydraulic body circuit 32 and the auxiliary hydraulic circuit 40 so that the prime mover operation may be optimized to meet load requirements by the auxiliary power module 24 while optimizing system performance such as energy consumption, noise, heat generation, etc.

Figure 2A:
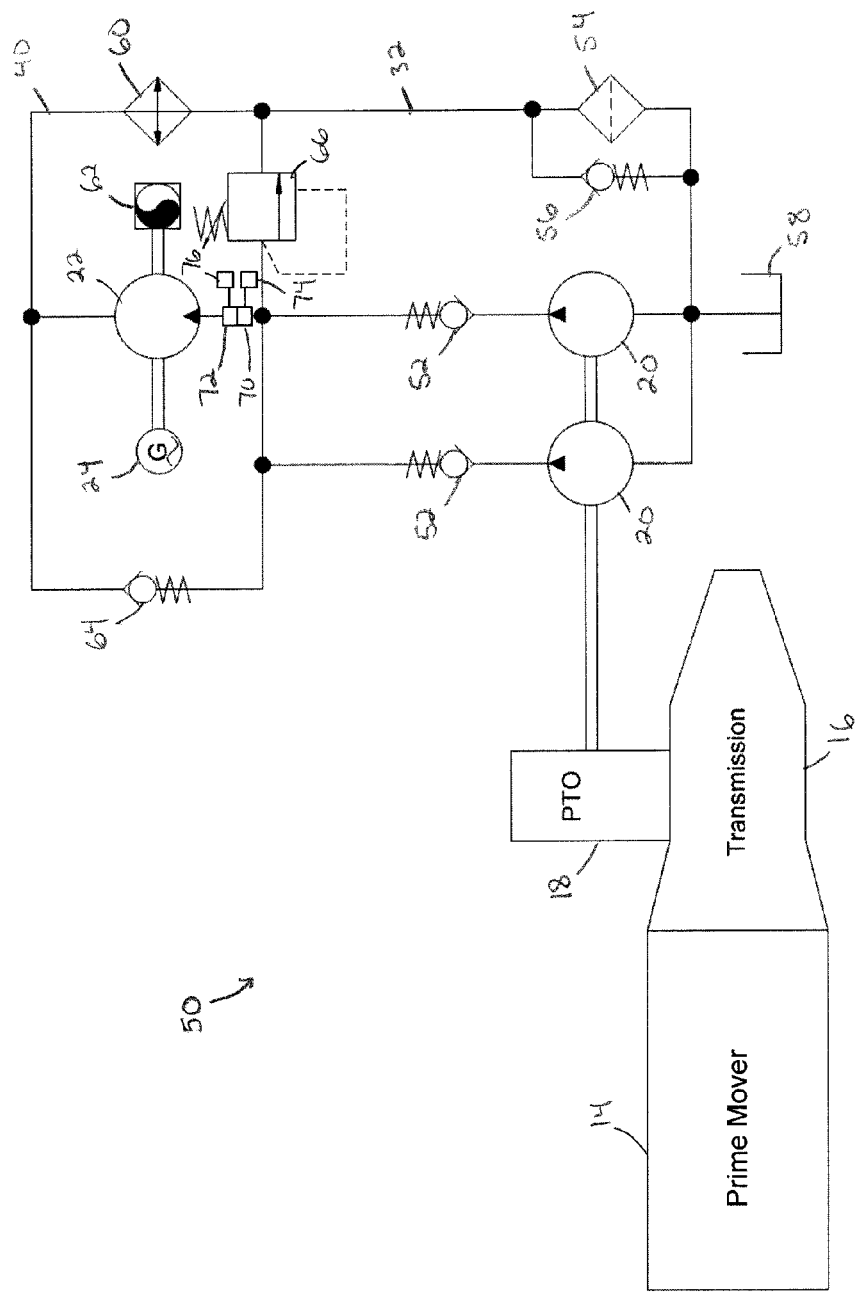
FIG. 2A is a schematic diagram of an exemplary power source including a prime mover/transmission/power take-off driven auxiliary power module with fixed displacement pumps and motor.

Turning now to FIG. 2A, an exemplary power source, which includes the illustrated vehicle 10 components and the auxiliary power module 12 discussed above, is illustrated generally at reference numeral 50. The vehicle 10 includes the prime mover 14, the transmission 16, the power take-off 18, and the hydraulic pumps 20, which may be fixed displacement hydraulic pumps. The vehicle 10 may also include a load holding check valve 52 between each hydraulic pump 20 and the hydraulic motor 22 for allowing unidirectional flow from pump 20 outlet to motor 22 inlet, a filter 54 for filtering the hydraulic fluid exiting the hydraulic motor 22, a bypass check valve 56 that allows the hydraulic fluid to bypass the filter 54 if the filter is clogged, and a reservoir 58.

The auxiliary power module 12 includes the hydraulic motor 22, which may be a fixed displacement hydraulic motor, the auxiliary power device 24, such as the generator, a heat exchanger 60 fluidly connected to the hydraulic motor 22 through the hydraulic circuit 40, a fan 62 driven by the hydraulic motor 22 to blow air over the heat exchanger 60 to cool the hydraulic fluid, an anti-cavitation check valve 64 along the auxiliary hydraulic circuit 42 for preventing the hydraulic motor 22 from cavitating, and a system pressure relief valve 66 along the auxiliary hydraulic circuit 42. The system pressure relief valve 66 is provided to direct fluid to the body hydraulic circuit 32 before it reaches the motor 22 if the pressure of the fluid is above a predetermined level. Alternatively, it will be appreciated that the system pressure relief valve 66 may be located along the body hydraulic circuit 32 between the pump outlet and motor 22 to direct fluid to a system reservoir before it reaches the motor 22 if the pressure of the fluid is above the predetermined level. It will also be appreciated that the hydraulic cooler onboard the vehicle may be used to cool the hydraulic fluid rather than the heat exchanger 60, or that the heat exchanger 60 may be used in addition to the onboard cooler.

To fluidly connect the auxiliary power module 12 to the vehicle components, and specifically to connect the body hydraulic circuit 32 to the auxiliary hydraulic circuit 40, first and second quick connect couplers 70 and 72 or other suitable coupler are provided. The first quick connect coupler 70 is fluidly connected to the output of the hydraulic pumps 20 through the body hydraulic circuit 32 and the second quick connect coupler 72, which may be provided on a hose, is fluidly connected to the hydraulic motor 22 through the auxiliary hydraulic circuit 40. To ensure the couplers 70 and 72 are fluidly connected, sensors 74 and 76 are respectively coupled to the couplers 70 and 72. The sensors 74 and 76, which may be position sensors or proximity sensors, are configured to send an electrical signal to indicate that the couplers 70 and 72 are fluidly connected. When the couplers 70 and 72 are fluidly connected, the fluid can flow from the hydraulic pumps 20, through the body hydraulic circuit 32, through the couplers 70 and 72 to the auxiliary hydraulic circuit 40, and then to the hydraulic motor 22.

During operation of the auxiliary power module 12, such as during emergency and disaster situations, the prime mover 14 may be started and run at a speed above the maximum load to prevent the prime mover 14 from being overburdened by the load at startup. After reaching steady state operation, the prime mover 14 may be set to a predetermined speed or may be managed as per the loading conditions. The hydraulic pumps 20 then supply a desired flow rate of fluid to the hydraulic motor 22 as a function of prime mover speed and any gear ratio in between. The high pressure hydraulic fluid enters the hydraulic motor 22 where the hydraulic energy is converted into mechanical energy to drive the generator 24, and the fluid exits the hydraulic motor 22 at a lower pressure and is routed to the heat exchanger 60. The low pressure fluid is cooled in the heat exchanger 60 and flows to the filter 54 where it is filtered and then delivered to the reservoir 58. In this way, unused vehicles during an emergency or disaster situation, such as refuse trucks, may be utilized as a source of auxiliary power, and the existing body hydraulics circuit and/or another auxiliary circuit, such as a snow plow circuit, may be utilized.

The converted mechanical energy at the motor output applies a torque on a shaft of the generator 24 that is determined by an electrical load connected across the generator terminals. The generator shaft speed is dictated by the flow rate of the fluid, which is a function of the prime mover speed, power take-off gear ratio, and volumetric efficiencies of the hydraulic components and their displacements. Accordingly, the generator speed, and hence the output frequency of the generator 24, is controlled by the prime mover speed. The motor torque, and therefore the system pressure, is set by the load. The foregoing system has a high efficiency because there are no throttling losses or pump operation at partial displacement, and the system has low cooling requirements.

Figure 2B:
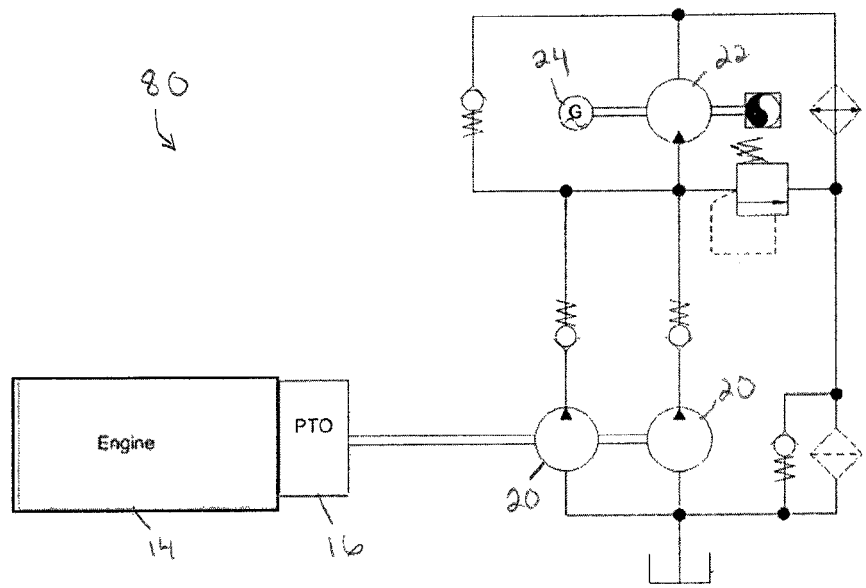
FIG. 2B is a schematic diagram of an exemplary power source including a prime mover/power take-off driven auxiliary power module with fixed displacement pumps and motor.

Turning now to FIG. 2B, the power source 80 is substantially the same as the power source 50, and thus the same reference numerals are used to denoted structures corresponding to similar structures in the power sources. The power source 80 differs from the power source 50 in that power take-off 18 is a prime mover driven power take-off rather than a transmission driven power take-off. Accordingly, the power take-off 18 is directly connected to the prime mover 14 to transfer power from the prime mover 14 to the hydraulic pumps 20, which are fixed displacement hydraulic pumps.

Figure 2C:
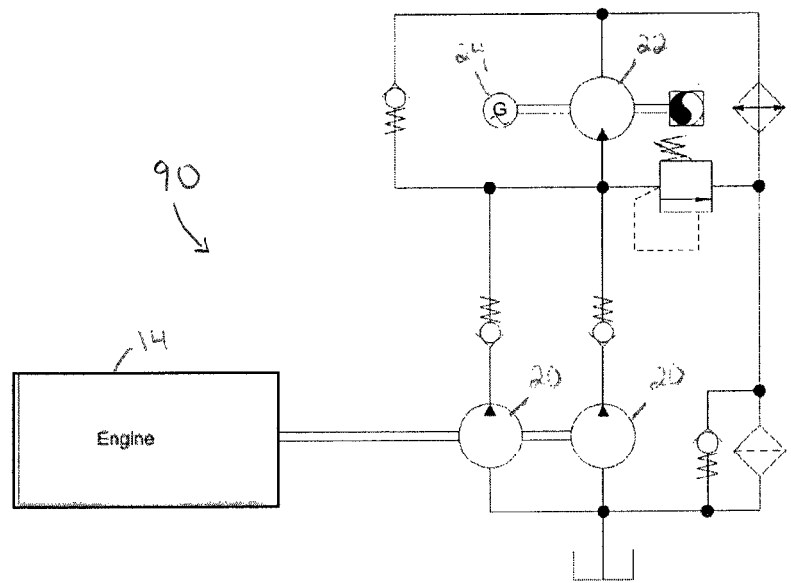
FIG. 2C is a schematic diagram of an exemplary power source including a prime mover driven auxiliary power module with fixed displacement pumps and motor.

Turning now to FIG. 2C, the power source 90 is substantially the same as the power source 50, and thus the same reference numerals are used to denoted structures corresponding to similar structures in the power sources. The power source 90 differs from the power source 50 in that the hydraulic pumps 20 are mechanically coupled to the prime mover 14 rather than through a transmission and power take-off. Accordingly, the prime mover 14 directly transfers power to the hydraulic pumps 20, which are fixed displacement hydraulic pumps.

Figure 3A:
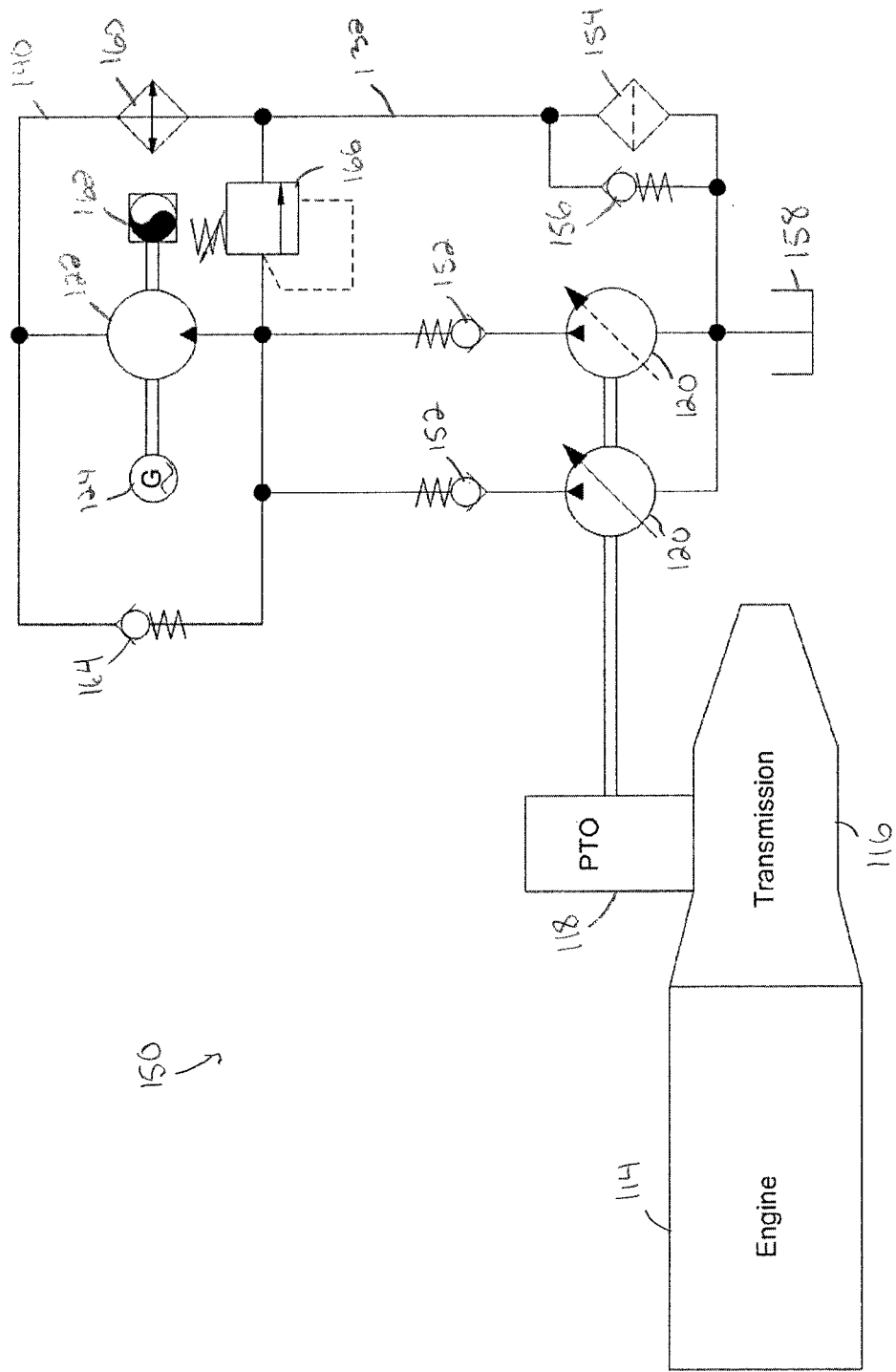
FIG. 3A is a schematic diagram of an exemplary power source including a prime mover/transmission/power take-off driven auxiliary power module with variable displacement pumps.

Turning now to FIG. 3A, an exemplary embodiment of the power source is shown at 150. The power source 150 is substantially the same as the above-referenced power source 50, and consequently the same reference numerals but indexed by 100 are used to denote structures corresponding to similar structures in the power sources. In addition, the foregoing description of the power source 50 is equally applicable to the power source 150 except as noted below.

The power source 150 includes a prime mover 114, transmission 116, power take-off 118, hydraulic pumps 120, a load holding check valve 152, a filter 154, a bypass check valve 156, and a reservoir 158. The power source also includes an auxiliary power module 112 which includes a hydraulic motor 122, which may be a fixed displacement hydraulic motor, an auxiliary power device 124, such as a generator, a heat exchanger 160, a fan 162, an anti-cavitation check valve 164, and a system pressure relief valve 166. Quick connect couplers may be provided to fluidly connect the auxiliary power module 112 to the vehicle components.

One or both of the hydraulic pumps 120 may be a variable displacement pump allowing the pump displacement to be controlled to allow for increased control over the flow rate in the hydraulic circuits 132 and 140, thereby allowing for increased control over the generator 124 output speeds. The variable displacement pump 120 allows for more precise control and quicker response to load changes or operator input changes than a fixed displacement pump, but may be less efficient at lower displacements. If the prime mover 114 is only being operated to power the auxiliary power module 112, then engine management may be achieved for a given power demand. The prime mover 114 optimization may depend on a number of factors, such as limits on speed, flow rate, and torque.

Figure 3B:
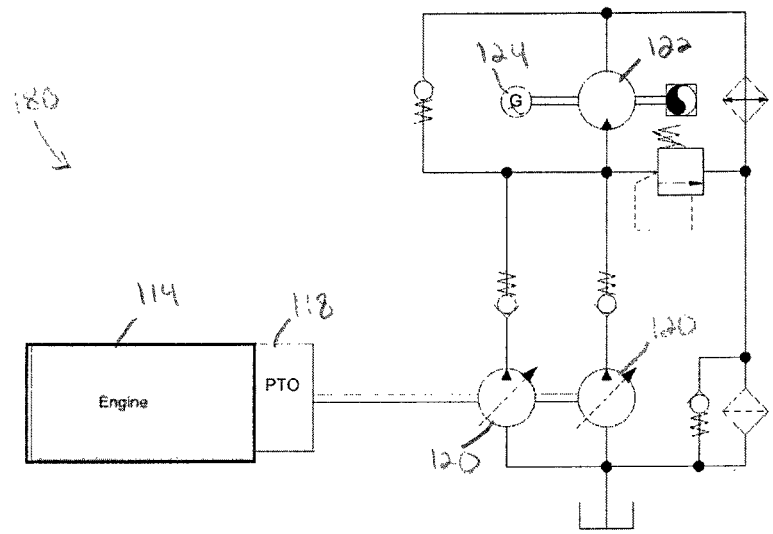
FIG. 3B is a schematic diagram of an exemplary power source including a prime mover/power take-off driven auxiliary power module with variable displacement pumps.

Turning now to FIG. 3B, the power source 180 is substantially the same as the power source 150, and thus the same reference numerals are used to denoted structures corresponding to similar structures in the power sources. The power source 180 differs from the power source 150 in that power take-off 118 is a prime mover driven power take-off rather than a transmission driven power take-off. Accordingly, the power take-off 118 is directly connected to the prime mover 114 to transfer power from the prime mover 114 to the hydraulic pumps 120, one or both of which may be variable displacement hydraulic pumps.

Figure 3C:
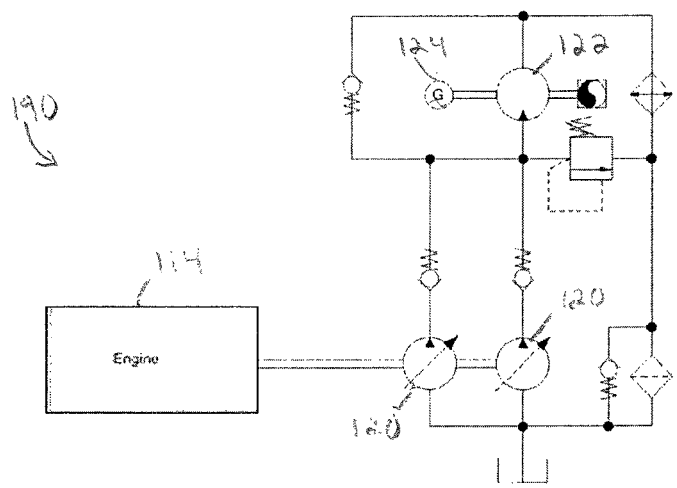
FIG. 3C is a schematic diagram of an exemplary power source including a prime mover driven auxiliary power module with variable displacement pumps.

Turning now to FIG. 3C, the power source 190 is substantially the same as the power source 150, and thus the same reference numerals are used to denoted structures corresponding to similar structures in the power sources. The power source 190 differs from the power source 150 in that the hydraulic pumps 120 are mechanically coupled to the prime mover 114 rather than through a transmission and power take-off. Accordingly, the prime mover 114 directly transfers power to the hydraulic pumps 120, one or both of which may be variable displacement hydraulic pumps.

Figure 4A:
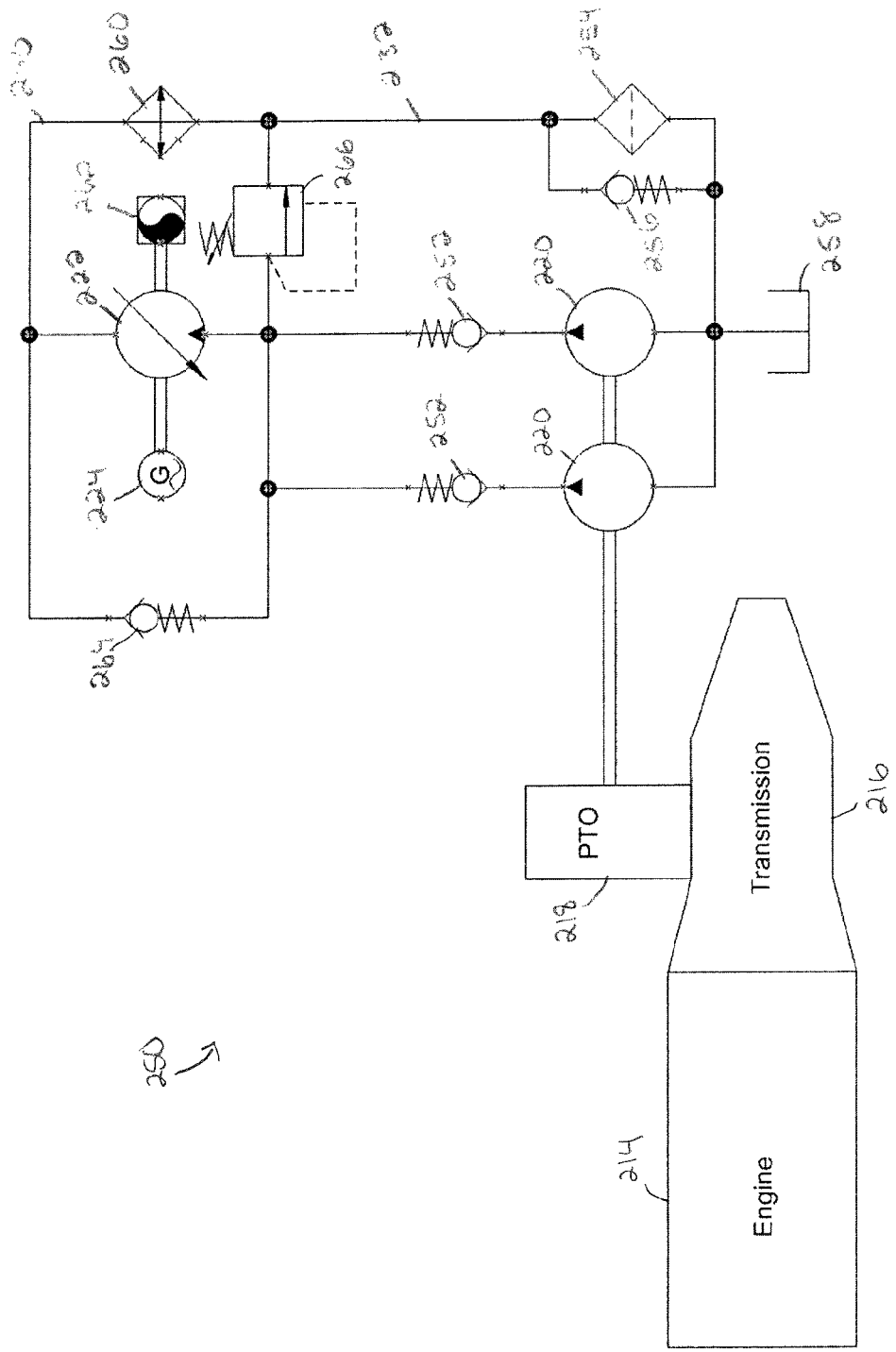
FIG. 4A is a schematic diagram of an exemplary power source including a prime mover/transmission/power take-off driven auxiliary power module with a variable displacement motor.

Turning now to FIG. 4A, an exemplary embodiment of the power source is shown at 250. The power source 250 is substantially the same as the above-referenced power source 50, and consequently the same reference numerals but indexed by 200 are used to denote structures corresponding to similar structures in the power sources. In addition, the foregoing description of the power source 50 is equally applicable to the power source 250 except as noted below.

The power source 250 includes a prime mover 214, transmission 216, power take-off 218, hydraulic pumps 220 which may be fixed or variable displacement hydraulic pumps, a load holding check valve 252, a filter 254, a bypass check valve 256, and a reservoir 258. The power source also includes an auxiliary power module 212 which includes a hydraulic motor 222, an auxiliary power device 224, such as a generator, a heat exchanger 260, a fan 262, an anti-cavitation check valve 264, and a system pressure relief valve 266. Quick connect couplers may be provided to fluidly connect the auxiliary power module 212 to the vehicle components.

The hydraulic motor 222 may be a variable displacement hydraulic motor, and one or both of the hydraulic pumps 220 may be fixed or variable displacement hydraulic pumps. The variable displacement hydraulic motor 222 allows the motor displacement to be controlled to allow for increased control over the flow rate in the hydraulic circuits 232 and 240, thereby allowing for increased control over the generator 224 output speed. The variable displacement motor 222 allows for more precise control and quicker response to load changes or operator input changes than a fixed displacement motor, but may be less efficient at lower displacements.

Figure 4B:
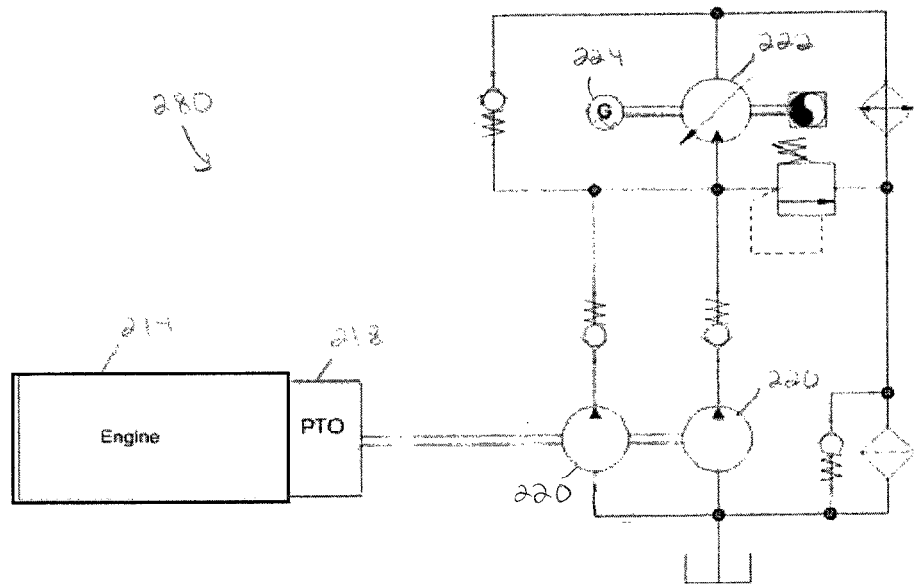
FIG. 4B is a schematic diagram of an exemplary power source including a prime mover/power take-off driven auxiliary power module with a variable displacement motor.

Turning now to FIG. 4B, the power source 280 is substantially the same as the power source 250, and thus the same reference numerals are used to denoted structures corresponding to similar structures in the power sources. The power source 280 differs from the power source 250 in that power take-off 218 is a prime mover driven power take-off rather than a transmission driven power take-off. Accordingly, the power take-off 218 is directly connected to the prime mover 214 to transfer power from the prime mover 214 to the hydraulic pumps 220, one or both of which may be variable displacement hydraulic pumps.

Figure 4C:
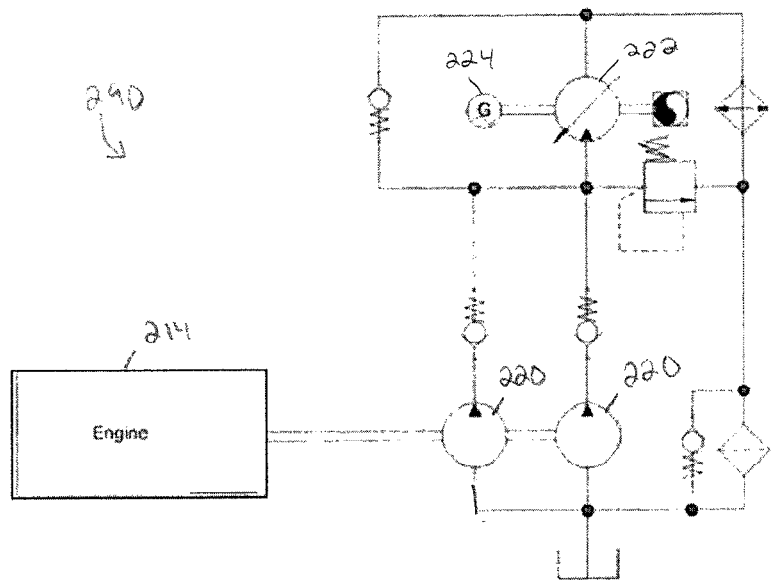
FIG. 4C is a schematic diagram of an exemplary power source including a prime mover driven auxiliary power module with a variable displacement motor.

Turning now to FIG. 4C, the power source 290 is substantially the same as the power source 250, and thus the same reference numerals are used to denoted structures corresponding to similar structures in the power sources. The power source 290 differs from the power source 250 in that the hydraulic pumps 220 are mechanically coupled to the prime mover 214 rather than through a transmission and power take-off. Accordingly, the prime mover 214 directly transfers power to the hydraulic pumps 220, one or both of which may be variable displacement hydraulic pumps.

Figure 5A:
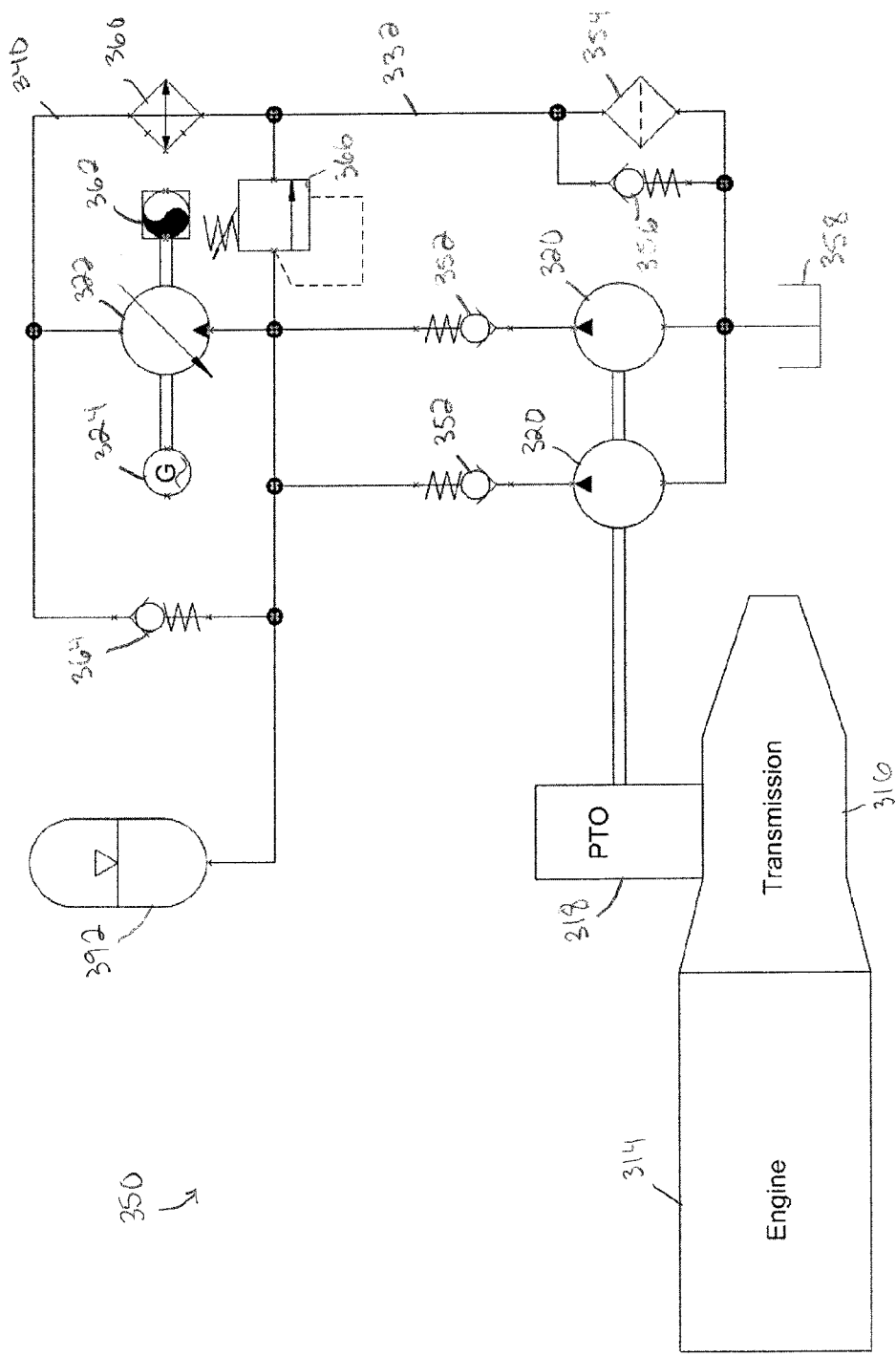
FIG. 5A is a schematic diagram of an exemplary power source including a prime mover/transmission/power take-off driven auxiliary power module with an accumulator.

Turning now to FIG. 5A, an exemplary embodiment of the power source is shown at 350. The power source 350 is substantially the same as the above-referenced power source 50, and consequently the same reference numerals but indexed by 300 are used to denote structures corresponding to similar structures in the power sources. In addition, the foregoing description of the power source 50 is equally applicable to the power source 350 except as noted below.

The power source 350 includes a prime mover 314, transmission 316, power take-off 318, hydraulic pumps 320, which may be fixed or variable displacement hydraulic pumps, a load holding check valve 352, a filter 354, a bypass check valve 356, and a reservoir 358. The power source also includes an auxiliary power module 312 which includes a hydraulic motor 322, which may be a variable displacement motor, an auxiliary power device 324, such as a generator, a heat exchanger 360, a fan 362, an anti-cavitation check valve 364, and a system pressure relief valve 366. Quick connect couplers may be provided to fluidly connect the auxiliary power module 312 to the vehicle components. The power module 312 also includes an accumulator 392 in a high pressure line of the hydraulic circuit 340 for storing hydraulic fluid to dampen pressure spikes due to load fluctuations on the generator. If the motor 322 is a variable displacement motor, the motor may help control the flow rate of the fluid entering the motor.

Figure 5B:
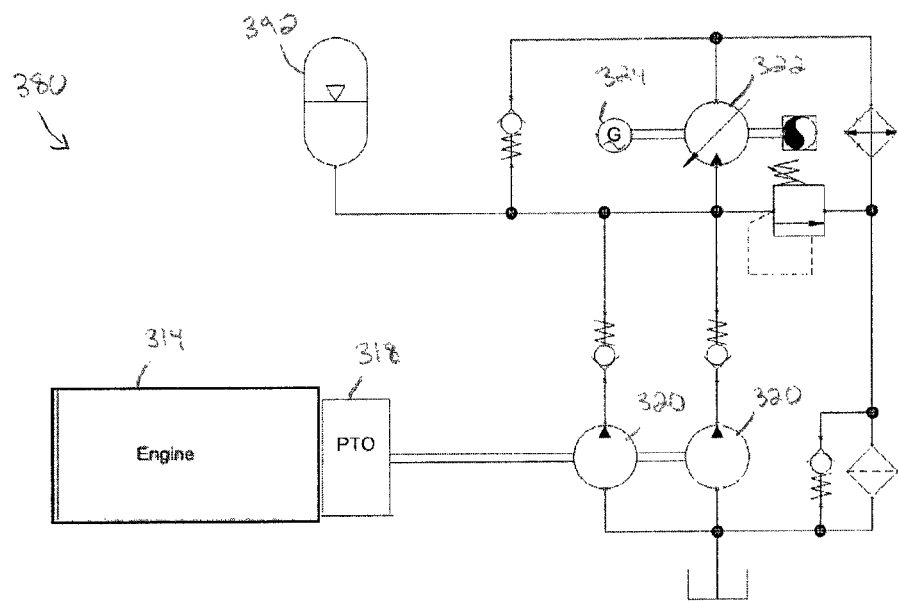
FIG. 5B is a schematic diagram of an exemplary power source including a prime mover/power take-off driven auxiliary power module with an accumulator.

Turning now to FIG. 5B, the power source 380 is substantially the same as the power source 350, and thus the same reference numerals are used to denoted structures corresponding to similar structures in the power sources. The power source 380 differs from the power source 350 in that power take-off 318 is a prime mover driven power take-off rather than a transmission driven power take-off. Accordingly, the power take-off 318 is directly connected to the prime mover 314 to transfer power from the prime mover 314 to the hydraulic pumps 320.

Figure 5C:
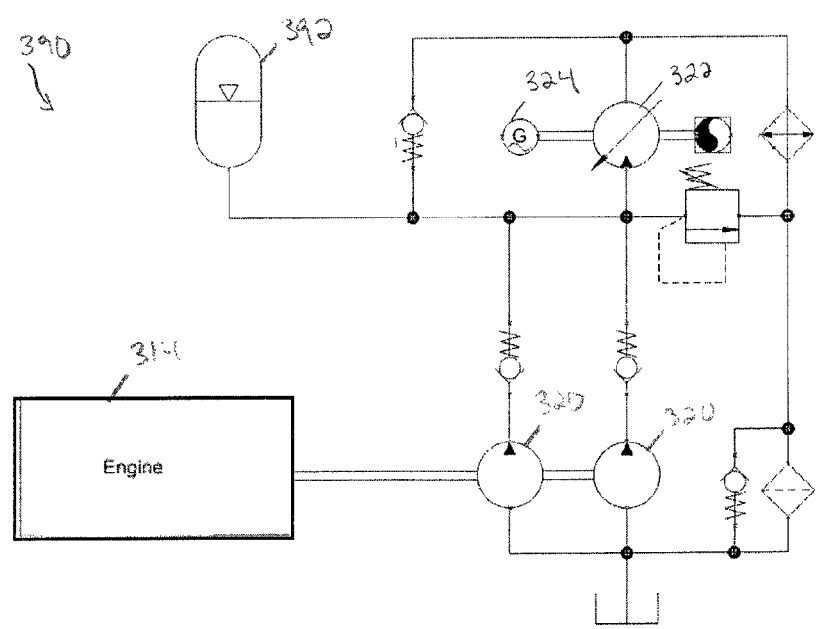
FIG. 5C is a schematic diagram of an exemplary power source including a prime mover driven auxiliary power module with an accumulator.

Turning now to FIG. 5C, the power source 390 is substantially the same as the power source 350, and thus the same reference numerals are used to denoted structures corresponding to similar structures in the power sources. The power source 390 differs from the power source 350 in that the hydraulic pumps 320 are mechanically coupled to the prime mover 314 rather than through a transmission and power take-off. Accordingly, the prime mover 314 directly transfers power to the hydraulic pumps 320.

Figure 6A:
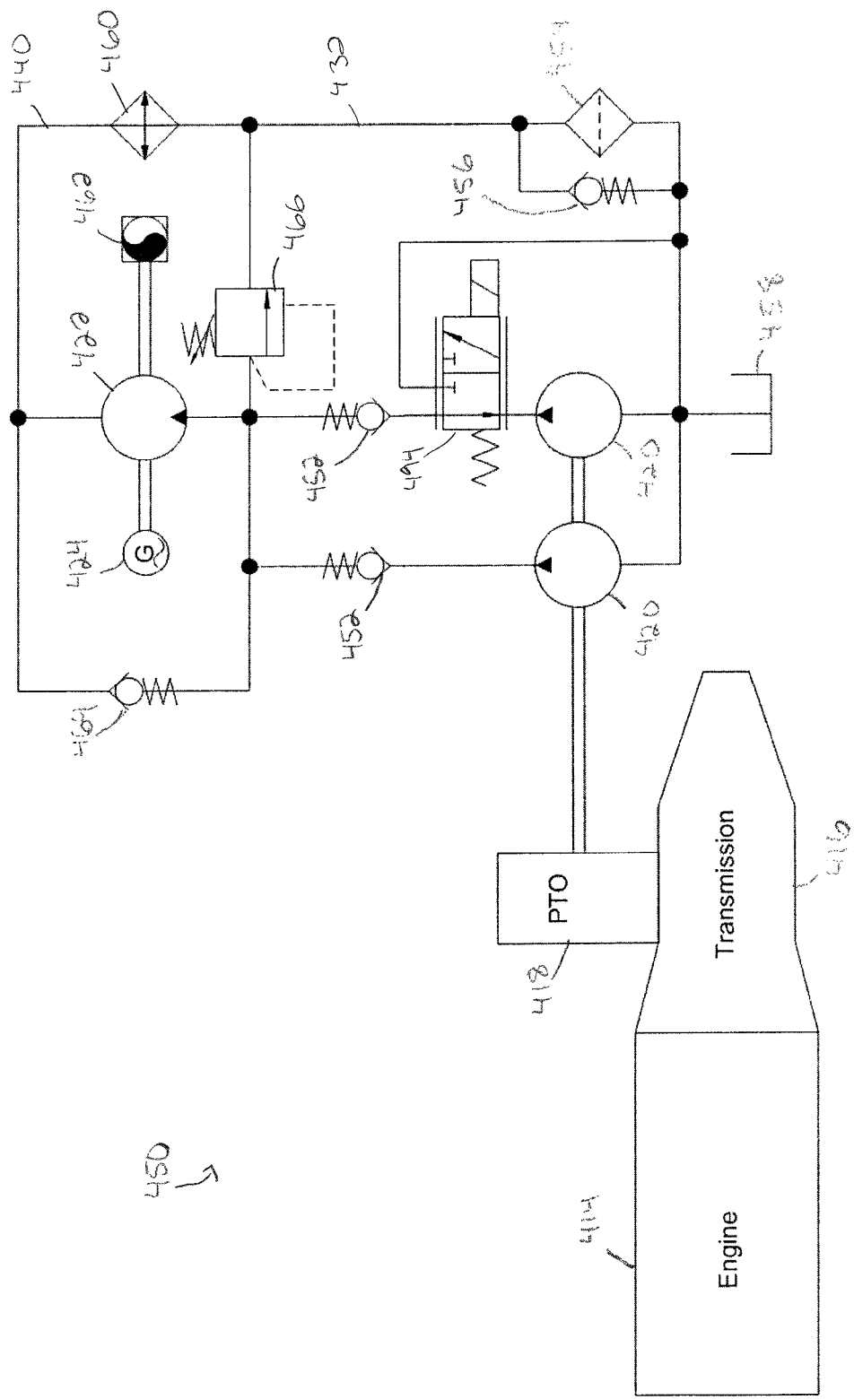
FIG. 6A is a schematic diagram of an exemplary power source including a prime mover/transmission/power take-off driven auxiliary power module with a flow control proportional valve.

Turning now to FIG. 6A, an exemplary embodiment of the power source is shown at 450. The power source 450 is substantially the same as the above-referenced power source 50, and consequently the same reference numerals but indexed by 400 are used to denote structures corresponding to similar structures in the power sources. In addition, the foregoing description of the power source 50 is equally applicable to the power source 450 except as noted below.

The power source 450 includes a prime mover 414, transmission 416, power take-off 418, hydraulic pumps 420, a load holding check valve 452, a filter 454, a bypass check valve 456, and a reservoir 458. The power source also includes an auxiliary power module 412 which includes a hydraulic motor 422, an auxiliary power device 424, such as a generator, a heat exchanger 460, a fan 462, an anti-cavitation check valve 464, and a system pressure relief valve 466. Quick connect couplers may be provided to fluidly connect the auxiliary power module 412 to the vehicle components.

The power source 450 also includes a flow control proportional valve 494 for controlling the flow rate of hydraulic fluid entering the hydraulic motor 422 by removing excess hydraulic fluid exiting the hydraulic pump 420, thereby allowing the hydraulic motor 422 to run at a constant speed. It will be appreciated that a second flow control proportional valve may be provided for controlling flow rate of the other hydraulic pump 420. It will also be appreciated that the flow control proportional valve may be provided in the auxiliary power module 412, before the motor 22 inlet, or on the vehicle as shown.

Figure 6B:
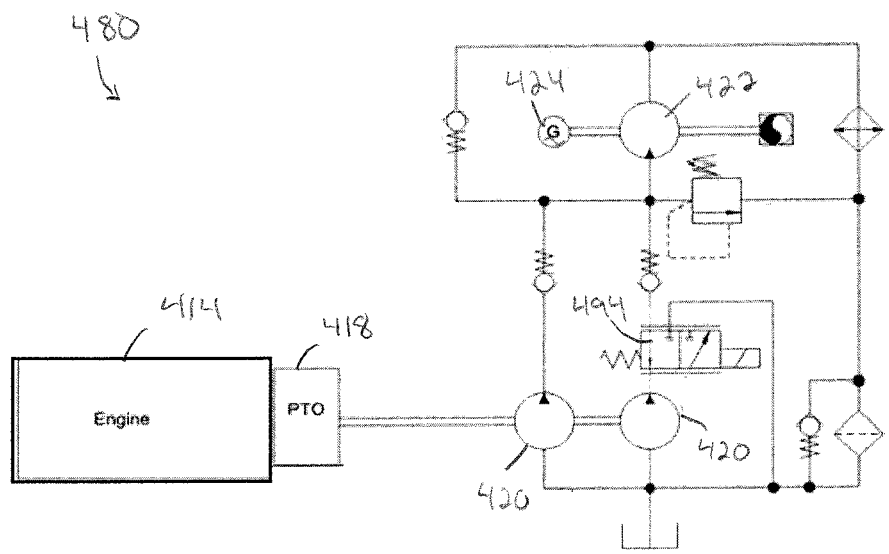
FIG. 6B is a schematic diagram of an exemplary power source including a prime mover/power take-off driven auxiliary power module with a flow control proportional valve.

Turning now to FIG. 6B, the power source 480 is substantially the same as the power source 450, and thus the same reference numerals are used to denoted structures corresponding to similar structures in the power sources. The power source 480 differs from the power source 450 in that power take-off 418 is a prime mover driven power take-off rather than a transmission driven power take-off. Accordingly, the power take-off 418 is directly connected to the prime mover 414 to transfer power from the prime mover 414 to the hydraulic pumps 420.

Figure 6C:
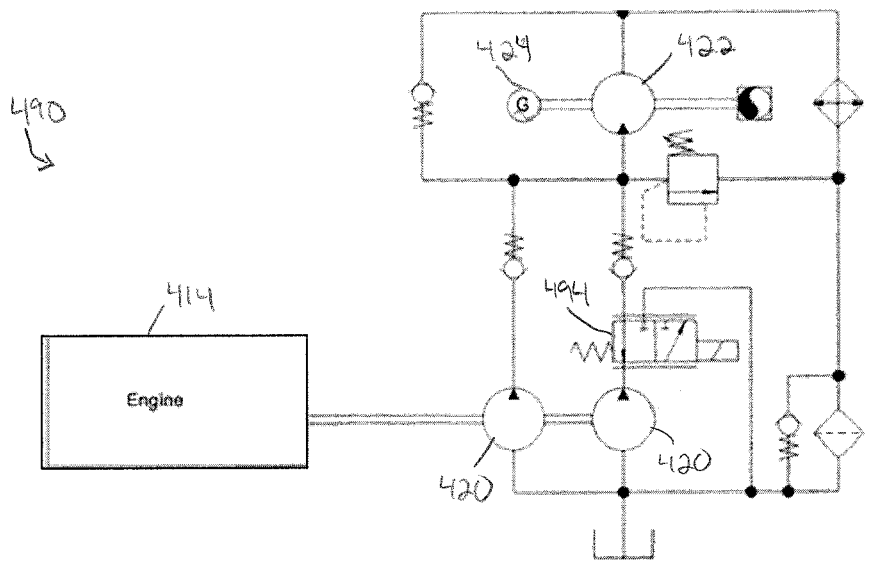
FIG. 6C is a schematic diagram of an exemplary power source including a prime mover driven auxiliary power module with a flow control proportional valve.

Turning now to FIG. 6C, the power source 490 is substantially the same as the power source 450, and thus the same reference numerals are used to denoted structures corresponding to similar structures in the power sources. The power source 490 differs from the power source 450 in that the hydraulic pumps 420 are mechanically coupled to the prime mover 414 rather than through a transmission and power take-off. Accordingly, the prime mover 414 directly transfers power to the hydraulic pumps 420.

Figure 7:
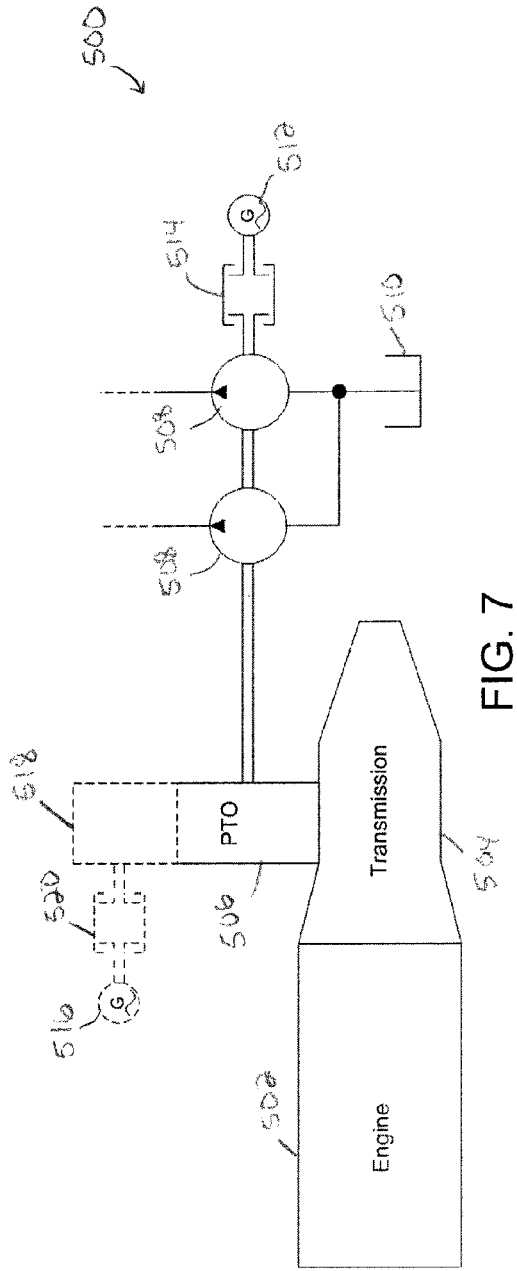
FIG. 7 is a schematic diagram of an exemplary power source including a prime mover/transmission/power-take off driven auxiliary power device.

Turning now to FIG. 7, a power source 500 is provided that includes a prime mover 502, such as an engine or electric motor, a transmission 504 for transferring power from the prime mover 502, a power take-off 506 connected to the transmission 504, one or more hydraulic pumps 508, such as a gear pump, a vane pump, a piston pump, etc. that are driven by energy from the prime mover 502 through the transmission 504 and power take-off 506, and a reservoir 510. An auxiliary power device 512, such as a generator, pump, or other hydraulic element may be driven mechanically by the pump shaft, and may be connected and disconnected from the pump shaft by a clutch 514. Alternatively, an auxiliary power device 516 may be mechanically driven by the power take-off 506 through a gear box 518, which can be connected and disconnected from the gear box 518 by a clutch 520. By directly coupling the auxiliary power device 512 or 516 to the prime mover speed, a high efficiency power source may be provided.

Figure 8:
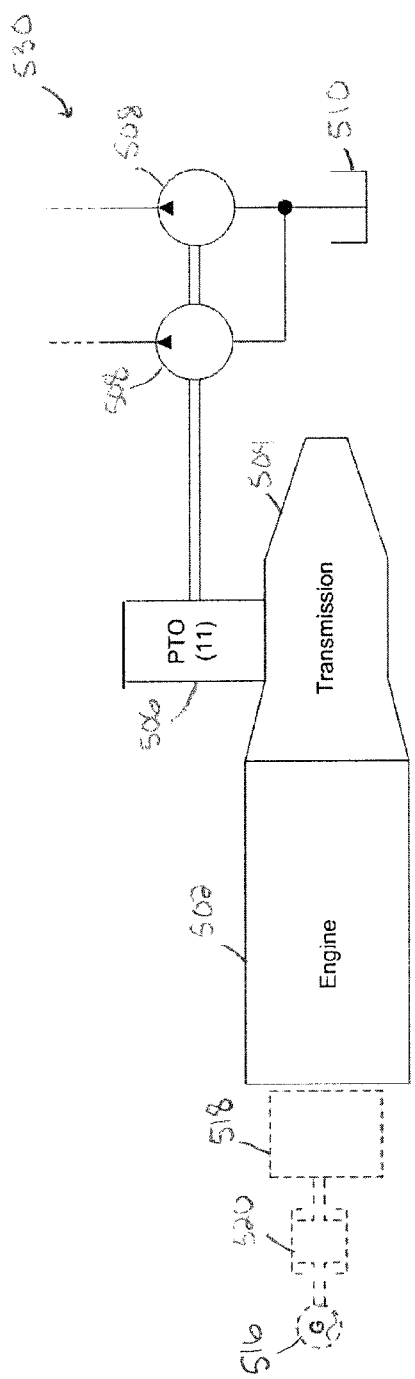
FIG. 8 is a schematic diagram of an exemplary power source including a prime mover driven auxiliary power device.

Turning now to FIG. 8, the power source 530 is substantially the same as the power source 500, and thus the same reference numerals are used to denoted structures corresponding to similar structures in the power sources. The power source 530 differs from the power source 500 in that the auxiliary power device 516 may be mechanically driven by the prime mover 502 through a gear box 518, rather than through the power take-off 506.

Figure 9:
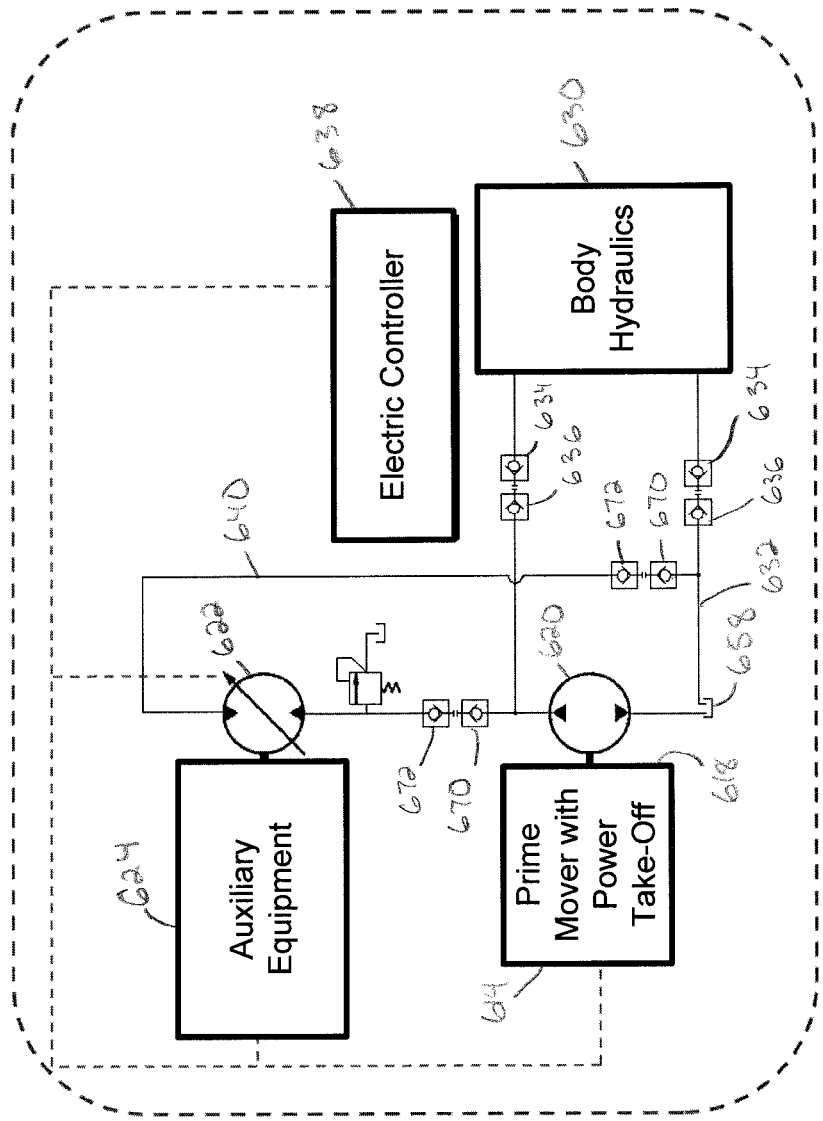
FIG. 9 is another schematic diagram of a vehicle and exemplary auxiliary power module.

Turning now to FIG. 9, another exemplary mobile platform 610 is shown connected to an auxiliary power module 612. The mobile platform 610 and auxiliary power module 612 are substantially the same as the above-referenced mobile platform 10 and auxiliary power module 12, and consequently the same reference numerals but indexed by 600 are used to denote structures corresponding to similar structures. In addition, the foregoing description of the mobile platform 10 and auxiliary power module 12 are equally applicable to the mobile platform 610 and auxiliary power module 612 except as noted below.

The mobile platform 610 includes a prime mover 614, a power take-off 618 connected to the prime mover 610, one or more hydraulic pumps 620, that are driven either directly by the prime mover 614 or through the power take-off 618, a reservoir 658, and body hydraulics 630 fluidly connected to the hydraulic pump 620 through hydraulic circuit 632 by quick connect couplers 634 that mate with quick connect coupler 636. The auxiliary power module 612 includes a hydraulic motor 622, which may be a variable displacement motor, and an auxiliary power device 624, such as a generator mechanically driven by the hydraulic motor 622. The hydraulic motor 622 may be fluidly connected to the hydraulic pump 620 through hydraulic circuits 630 and 640 by quick connect couplers 670 that mate with quick connect couplers 672. One or more controllers 638 may also be provided on the mobile platform 610 and/or the auxiliary power module 612 for receiving inputs from the auxiliary equipment 624, the body hydraulics 630, etc. and controls the prime mover 614 to meet the load demands on the system.

Figure 10:
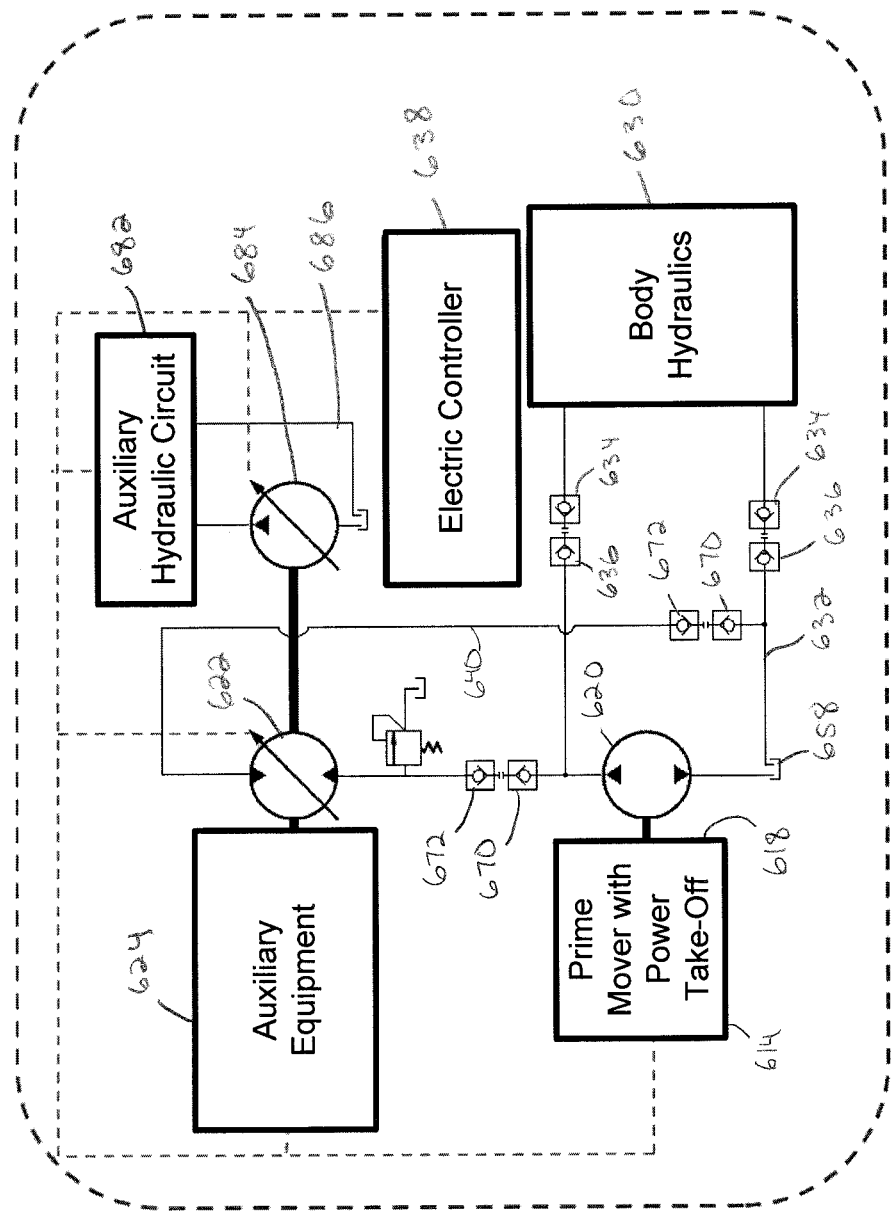
FIG. 10 is still another schematic diagram of a vehicle and exemplary auxiliary power module.

Turning now to FIG. 10, the auxiliary power module 612 is shown connected to a secondary auxiliary hydraulic device 682. A hydraulic pump 684 is provided that is mechanically driven by hydraulic motor 622 to deliver hydraulic fluid to the secondary auxiliary hydraulic device 682 through a secondary hydraulic circuit 686. Fluid exiting the secondary auxiliary hydraulic device 682 can then be delivered to a reservoir 688 through the secondary hydraulic circuit 686.

Figure 11:
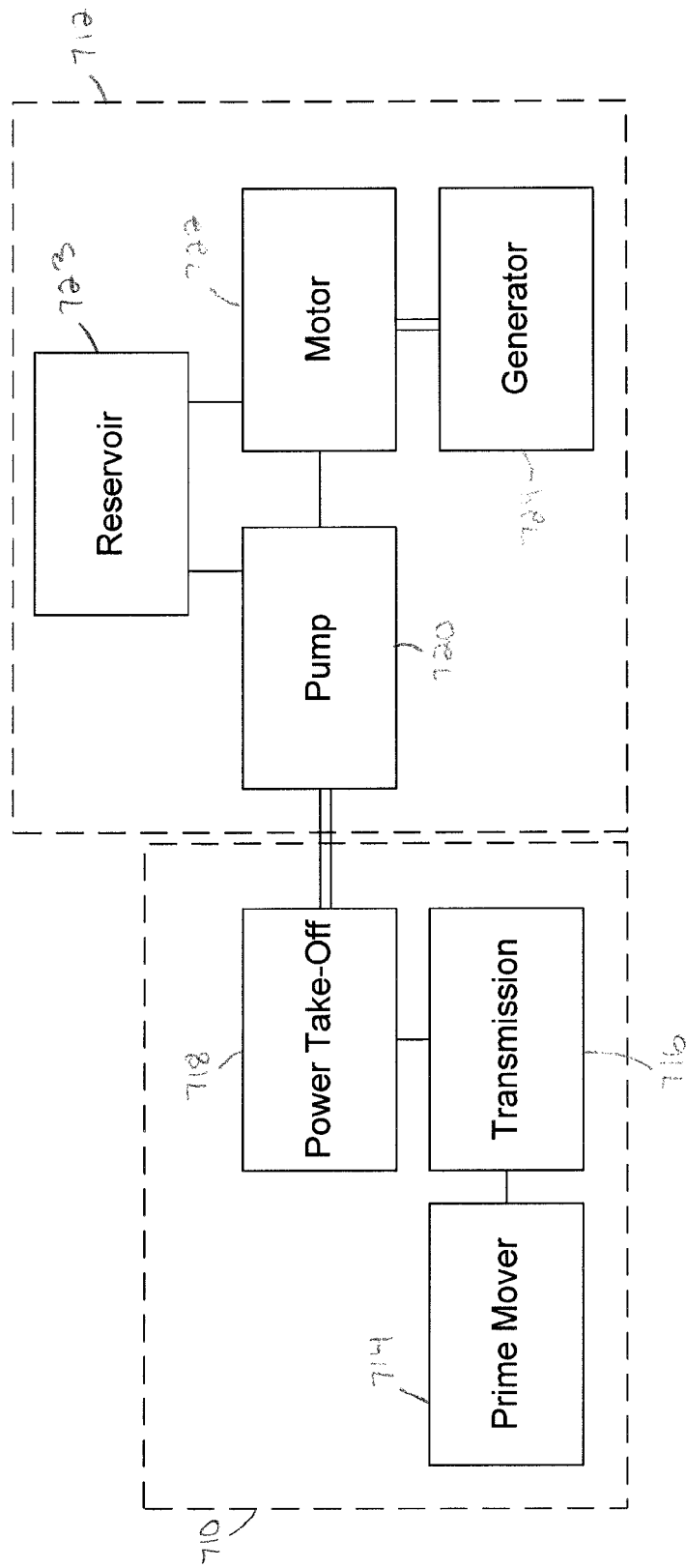
FIG. 11 is still another schematic diagram of a vehicle and exemplary auxiliary power module.

Turning now to FIG. 11, another exemplary mobile platform 710 is shown connected to an auxiliary power module 712. The mobile platform 710 and auxiliary power module 712 are substantially the same as the above-referenced mobile platform 10 and auxiliary power module 12, and consequently the same reference numerals but indexed by 700 are used to denote structures corresponding to similar structures. In addition, the foregoing description of the mobile platform 10 and auxiliary power module 12 are equally applicable to the mobile platform 710 and auxiliary power module 712 except as noted below.

The mobile platform 710 includes a prime mover 714, a transmission 716 for transferring power from the prime mover 714, and a power take-off 718 connected to the transmission 716, but does not include a hydraulic circuit or hydraulic pump. The auxiliary power module 712 includes a hydraulic pump 720 driven by energy from the prime mover 714 through the transmission 716 and power take-off 718, a hydraulic motor 722 fluidly connected to the hydraulic pump 720 by a hydraulic circuit, an auxiliary power device 724, such as a generator mechanically driven by the hydraulic motor 722, and a reservoir 723 connected to the hydraulic pump and hydraulic motor. Alternatively, the power take-off 718 may be directly connected to the prime mover 714.

Figure 12:
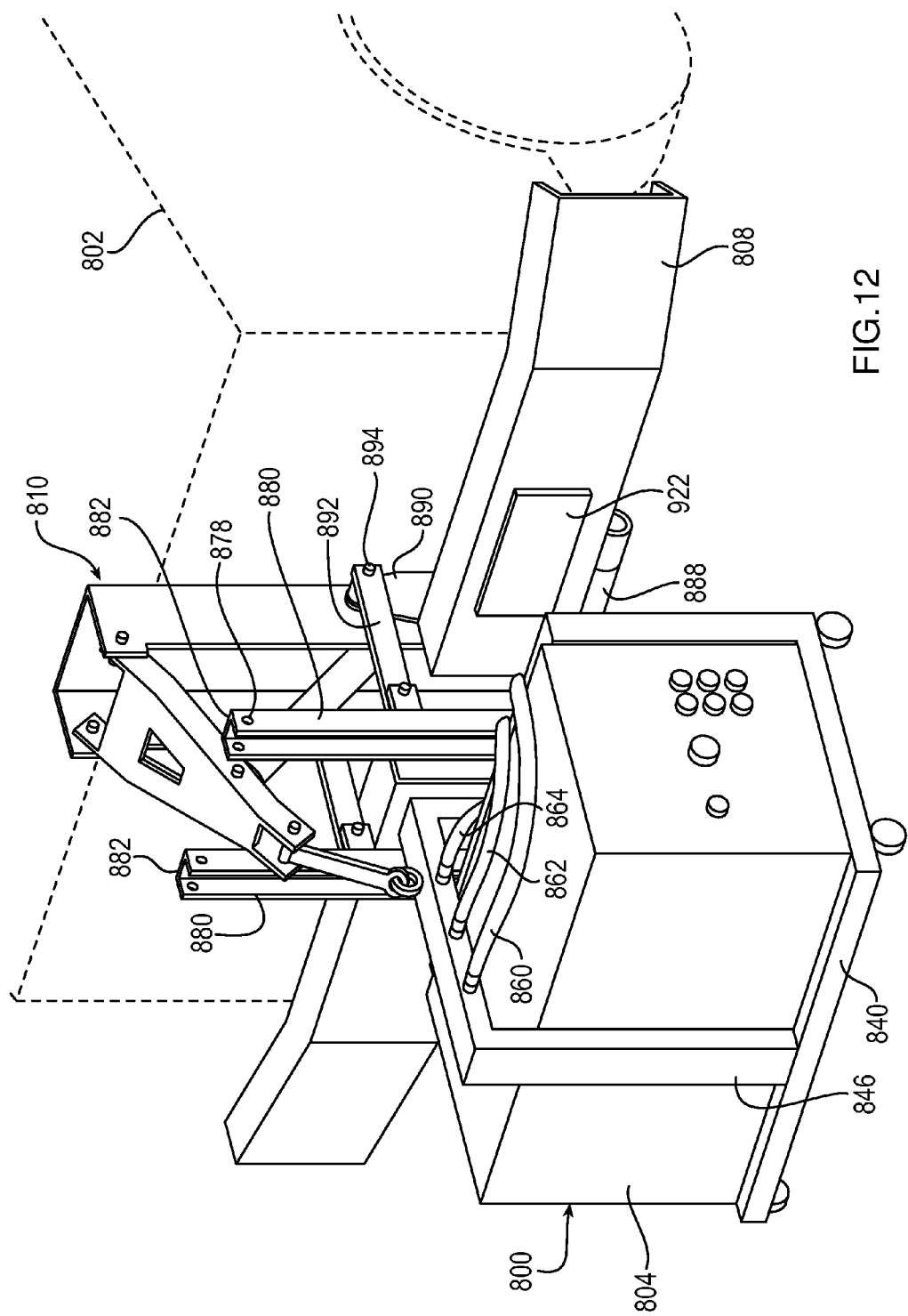
FIG. 12 is a perspective view of an exemplary auxiliary hydraulic module coupled to a vehicle.
Figure 13:
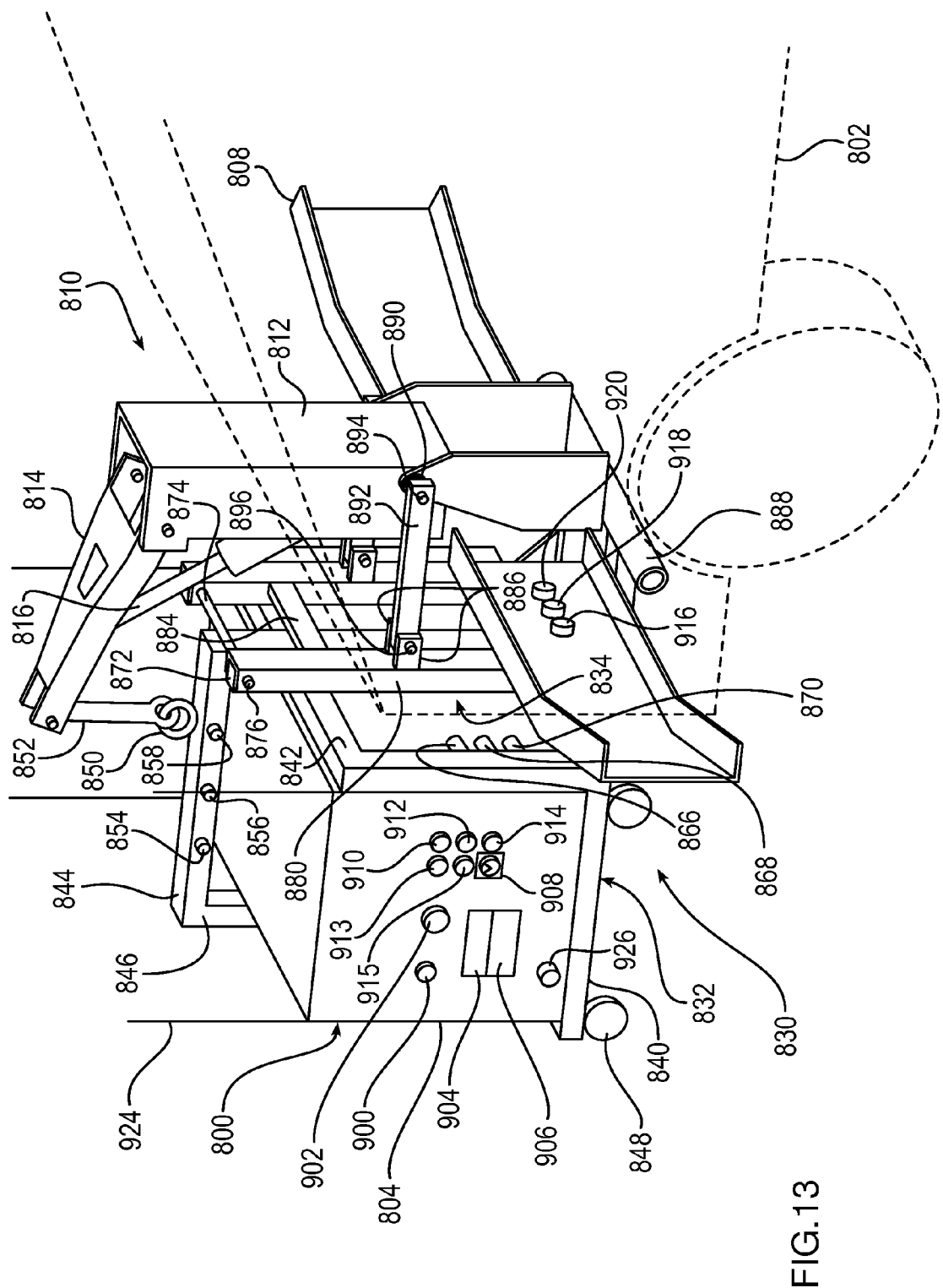
FIG. 13 is another perspective view of the exemplary auxiliary hydraulic module coupled to the vehicle.

Turning now to FIGS. 12 and 13, any auxiliary power module 800, which may be substantially the same as any of the above-described auxiliary power modules 12, 112, 212, 312, 412, 612, and 712 and thus the foregoing descriptions of the auxiliary power modules are equally applicable, is shown connected to the vehicle 802, which may be substantially the same as vehicle 10 and thus the foregoing description of the vehicle 10 is equally applicable. The auxiliary power module 800 includes a housing 804 that serves as a dust and moisture cover and the vehicle 802 includes a bumper 808 and a mount 810, such as a snow plow mount coupled to the bumper and/or the frame of the vehicle 802. The snow plow mount 810 includes a support 812 connected to an arm 814 that can move up and down by actuation of cylinder 816, for example to raise, lower and support the auxiliary power module 800.

The auxiliary power module 800 is coupled to the snow plow mount 810 by a mounting assembly 830, which may be used to couple any of the above-described auxiliary power modules to a vehicle. The mounting assembly 830 includes a cradle 832 configured to support the auxiliary power module 800 and a mounting bracket 834 configured to be coupled to the cradle 832 and the vehicle 802.

The cradle 832 includes a base 840 supporting a bottom of the housing 804, a rear portion 842 projecting upward from the base 840 configured to face the vehicle 802, a top portion 844 extending from the rear portion 842 parallel to the base 840, a front portion 846 extending between the top portion 844 and the base 840, and suitable wheels 848, such as metal or steel casters attached to a bottom of the base 840 to allow the housing 804 to be grounded. One or more eye bolts 850 may extend upward from the top portion 844 for connecting to the arm 814 by a suitable connector, such as hook 852.

The top portion 844, or any other suitable area of the cradle 832 may also include a plurality of quick connect couplers 854, 856, and 858 for mating with quick connect couplers on hoses 860, 862, and 864 to mount the hoses during transit. The quick connect couplers may also allow for a test port to be provided for testing and relieving trapped fluid in the high pressure line on the generator side. Hydraulic ports 866, 868, and 870 may be provided on the auxiliary hydraulic module 800 to which hydraulic hoses may be connected.

The mounting bracket 834 includes vertically extending members 880 each having a channel 882 running at least partially along a length of the respective member and configured to face the auxiliary power module 800, horizontally extending members 884 connecting the members 880, a pair of horizontally spaced rearwardly projecting members 886 projecting from each of the members 880 and configured to face the vehicle 802, and a rearwardly projecting member 888 that may be coupled to the vehicle bumper or frame. The mounting bracket 834 is configured to be coupled to existing snow plow mounting points 890 on the mounting assembly 830 via links 892, which are part of the mounting assembly 830. The links 892 are coupled to the existing mounting points 890 via pins 894 and coupled to the mounting bracket 834, and specifically between a respective pair of rearwardly projecting members 886 via pins 896 that extend through openings in the rearwardly projecting members 886.

To connect the cradle 832 to the mounting bracket 834 when the mounting bracket 834 is connected to the snow plow mount 810, the arm 814 may first be connected to the top portion 844 of the cradle 832 while the auxiliary power module 800 is grounded. The cylinder 816 is then actuated to lift the auxiliary power module 800 into position. As the arm 814 moves the cradle 832 into position, rearwardly projecting mount alignment members 872 that project from the rear portion 842 of the cradle 832 are aligned with the channels 882 in the vertically extending members 880. One or more rods 874, and as illustrated a pair of rods may then be inserted through corresponding openings 878 in the alignment members 872 and the vertically extending members 880 and secured at either end of the rods 874 by pins 876 to couple the cradle 832 to the mounting bracket 834.

When the mounting assembly 830 is disconnected from the snow plow mount 810, the mounting assembly, including the cradle 832, mounting bracket 834, links 892, rods 874, and pins 876, 894, and 896, may be stored with the auxiliary power module 800 to allow for ease of storage, quick connection to a vehicle, and to prevent components from being misplaced. The snow plow or other auxiliary device may then be attached to the vehicle 802.

With continued reference to FIGS. 12 and 13, the auxiliary hydraulic module 800 includes a stop switch 900 for shutting down the power source or a component such as the generator in the power source, an enable switch 902 for activating the power source, a display 904 for monitoring operation and health of the power source, a touchpad or software based voltage selector 906 for switching among various voltages and/or a voltage selector switch 908 for physically switching between voltages such as single phase and three phase.

A plurality of connectors 910, 912, 913, 914, and 915, such as camlock or hubbell type connectors, may be provided to connect the generator outlet to a point of use through respective electrical cables. The hoses 860, 862, and 864 may connect to the hydraulic ports 866, 868, and 870 in any suitable manner, such as by quick connect couplers, threaded connectors, etc, and the hoses may couple to ports on the vehicle in any suitable manner, such as by quick connect couplers mated with quick connect couplers 916, 918, and 920 on the vehicle 802. The quick connect couplers 916, 918, and 920 may be covered by one or more protective plates 922 during transit to protect the couplers from damage, for example during a front or side impact. The auxiliary power module 802 may also include visibility guide rails 924 extending from the housing 804 for driver visibility during transit and a bulkhead connector 926 for connecting to a single electrical umbilical cable that is configured to connect to a bulkhead connector on the vehicle for generator control, fault diagnostic and handling, start/stop command, and two way data communication.

Figure 14:
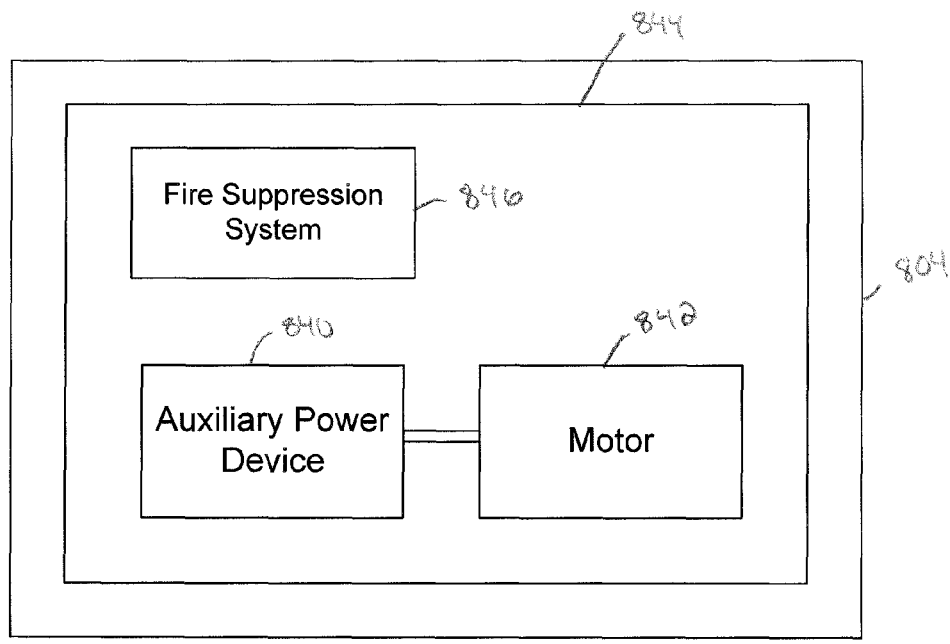
FIG. 14 is a schematic view of components of an exemplary auxiliary hydraulic module.

Referring now to FIG. 14, a schematic view of the components contained within the housing 804 of the auxiliary hydraulic module 800 is shown. Contained within the housing 804 is an auxiliary power device 840 and hydraulic motor 842, which may be substantially the same as the above-described power devices and motors, rails 844 surrounding the power device 840 and motor 842 to prevent damage during storage and transportation, and a fire suppression system 846. The fire suppression system 846 may be any suitable system, such as a compressed inert gas configured to put out a fire in the power device 840, hydraulic motor 842, or hydraulic fluid in the system.

Figure 15:
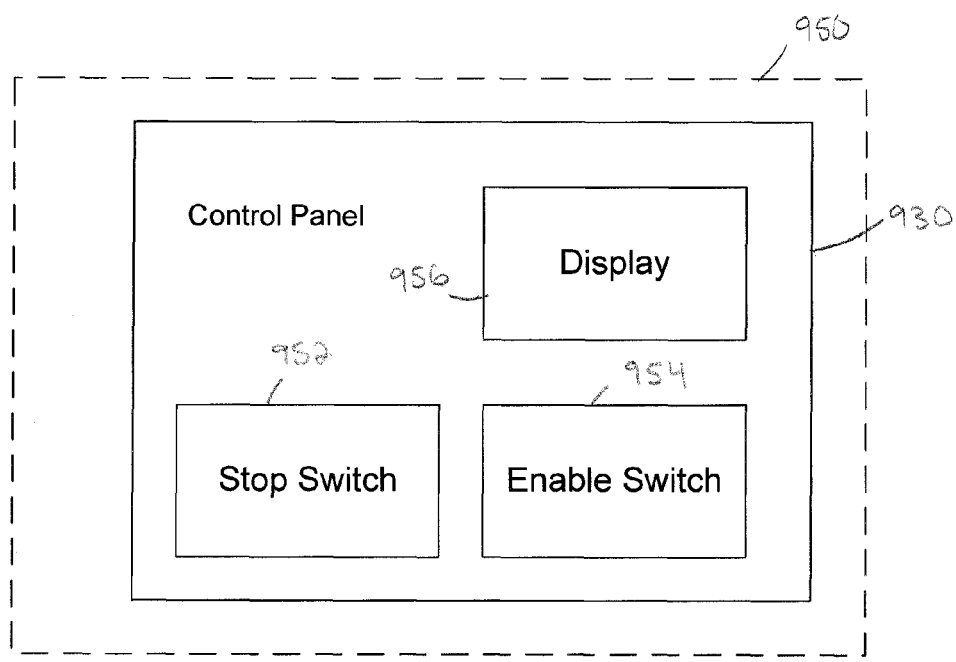
FIG. 15 is a schematic view of an exemplary vehicle cab.

Referring now to FIG. 15, a schematic view of an exemplary vehicle cab 950 is shown. The vehicle cab 950 may be included in any of the above-identified vehicles for any of the above-identified power sources. The vehicle cab 950 may include, in addition to or in place of the stop switch 900, the enable switch 902, and the display 904, a control panel 930, which includes a emergency-stop switch 952 for shutting down the power source or a component such as the generator in the power source, an enable switch 954 for activating the power source, and a display 956 for monitoring operation and health of the power source.

Figure 16:
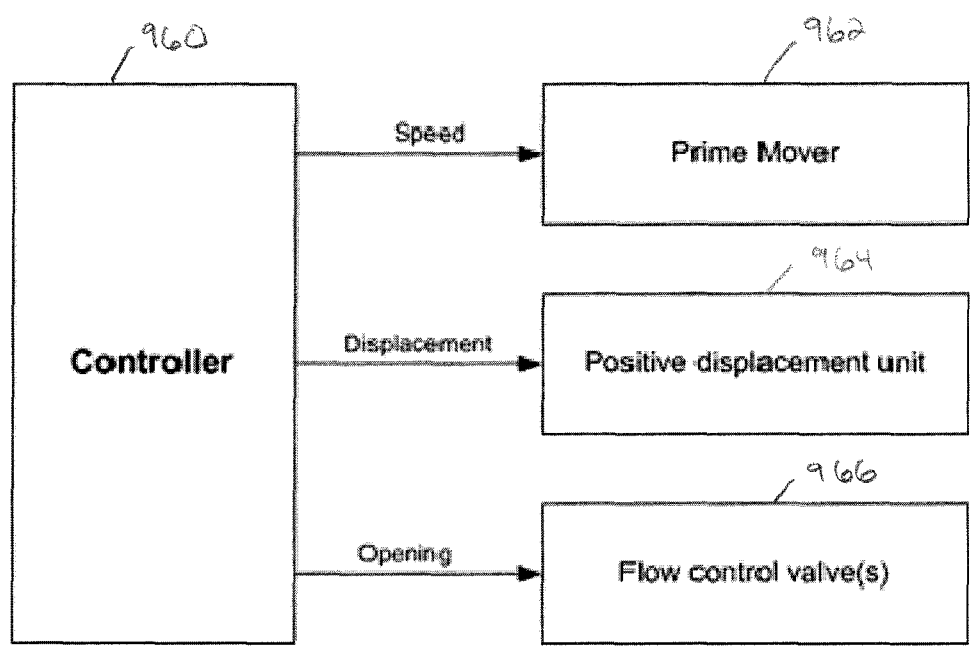
FIG. 16 a schematic view of an exemplary controller.

Referring now to FIG. 16, an exemplary controller 960 is shown. The controller 960 may be used with any of the above described vehicles and auxiliary hydraulic modules, and may be located on the vehicles and/or the auxiliary hydraulic modules. The controller 960 is configured to control prime mover speed, pump displacement, and/or flow control mechanism simultaneously to handle load transients. The controller 960 is configured to control the speed of the prime mover 962 depending on power demand on the generator, for example by lowering engine speed at lower power demand. The controller 960 is configured to control displacement of pump 964, for example in conjunction with prime mover speed, to regulate the pump flow rate. The controller 960 is configured to control the flow control mechanism 966, for example if the pump is a fixed displacement pump, to tune the flow rate of fluid to the motor to provide more control over motor speed and generator frequency. The flow control mechanism may be actuated by electrically, hydraulically, manually, pneumatically, etc. If actuated pneumatically, a supply of compressed air/gas may be fed by an integrated air system charged by the prime mover air compressor for controlling the generator via pneumatically controlled valves.

The controller 960 may monitor the electrical and hydraulic parameters of interest and adjust prime mover speed, pump displacement, flow control mechanism and field excitation currents to control generator output voltage and frequency in a feedback loop. The controller may also monitor and handle faults by receiving sensor inputs related to system health and safety.

The auxiliary power controller 960 may be able to disable the prime mover after-treatment regeneration by setting a regeneration permit switch to disable position. The switch can be of soft switch via a communication protocol or a hard switch via the vehicles instrument cluster. If the prime mover after treatment regeneration cannot be disabled, then when regeneration occurs, a warning signal may be sent to the controller. The controller will then monitor the system performance to adapt prime mover operation conditions and may de-rate or stop generator power.

The above-described auxiliary hydraulic modules connected to the vehicles may provide output power to allow for single output power capability or multiple interconnected vehicles to provide combined power output that can be controlled from the vehicle, from the modules, or remotely, for example when the vehicles are connected to a system with remote actuation and power provision to operate the auxiliary output power. The vehicles may be connected and placed in a standby protocol that will allow output power to be brought online as needed to meet power requirements.

For vehicles having hybrid electric transmissions, a separate electric circuit may be provided for outputting power from the vehicle, and the auxiliary electric module may be independent of the vehicle hardware or integrated into the vehicle so that it can be powered by the existing electric propulsion circuit providing the electric power for the use in powering auxiliary modules as noted above or connectivity of electric power in single or multiple variations. The vehicle and auxiliary module may be controlled in a similar manner as the vehicles and modules discussed above. Similarly, for vehicles having hybrid hydraulic transmissions, a separate circuit and plumbing with hydraulic components and controls may be independent of the vehicle hardware or integrated into the vehicle so that it can be powered by the existing hydraulic hybrid propulsion circuit providing the hydraulic pressure and flow the auxiliary module.

The above-described vehicle may include a refuse truck such as a rear loader, side loader, front loader, recycling vehicle, container transfer vehicle, etc., a bus such as a bus having wheel chair access that can store an auxiliary power module, utility vehicles, salt spreaders, front end loaders, dump trucks, street sweepers, excavators, concrete pumps, forest machinery, etc. The vehicle may have any suitable transmission, such as a conventional transmission with a power take-off, a hydraulic hybrid or non-hybrid such as hydrostatic transmission, a diesel transmission, a brake energy recovery transmission, a hybrid electric transmission, etc. The above-described vehicles may include a power take-off or may have a power take-off connected to the engine and controls. For vehicles having a partial or full power power take-off with one or more clutches, hydraulic pumps and hydraulic motors, the auxiliary power device may be engaged mechanically, for example through the power take-off, gear box and clutches, or hydraulically, and the pump may be located on the vehicle or in the auxiliary power module. Additionally, areas in the vehicles, such as the rear of a refuse truck, may be used as a storage area for the auxiliary power module, a storage area for debris, such as leaves and, or water pump via the use of a removable bladder. Any suitable engine may be used, such as a US 10 EPA on-highway engine, a compressed natural gas engine, a liquefied petroleum gas engine, a propane engine, etc.

It will be appreciated that the above-described systems may have integrated hardware, controls, and displays to allow, for example, vehicle stopping and isolation, control of the prime mover using engine communication protocols to meet load demands and system synchronization when multiple systems are interconnected from the vehicle, auxiliary power device, or remote operation, quick disconnects that allow for the interconnection of controllers, hydraulic or electric lines, and power management elements, fault handling and diagnostics for system monitoring, and override management on the vehicle, interconnect, and power management elements.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An auxiliary power module removably connectable to a mobile platform to be powered by a prime mover mounted on the platform, wherein the mobile platform includes a hydraulic pump that supplies hydraulic fluid to body hydraulics of the mobile platform for work or propulsion functions during typical operation of the mobile platform, the auxiliary power module including:
   a housing;
   at least one auxiliary power device contained within the housing, wherein the auxiliary power device is a generator;
   at least one hydraulic motor contained within the housing and mechanically connected to the auxiliary power device for driving the auxiliary power device;
   a fluid connector fluidly connected to the hydraulic motor and configured to mate with a fluid connector on the mobile platform to fluidly connect the hydraulic motor to the hydraulic pump on the mobile platform; and
   a mounting system for coupling the auxiliary power module to the mobile platform, the mounting system including:
   a cradle for supporting the auxiliary power module on which a bottom of the housing removably rests, and
   a mounting bracket configured to be coupled to the mobile platform and to
   the cradle to secure the auxiliary power module to the mobile platform, the mounting bracket including a moveable arm for enabling raising, lowering, and supporting of the cradle supporting the auxiliary power module,
   wherein the auxiliary power module is configured to be demountable from the mobile platform when the fluid connector is disconnected from the fluid connector on the mobile platform, the auxiliary power module being contained as a unit within the housing when the auxiliary power module is demounted from the mobile platform.

2. The auxiliary power module according to claim 1, wherein the mounting bracket includes at least two vertically extending members that include channels for mating with corresponding protrusions on the cradle.

3. The auxiliary power module according to claim 2, further including a first lock member coupled to the mounting bracket and protrusions and a second lock member coupled to the mounting bracket and protrusions that secure the cradle to the mounting bracket.

4. The auxiliary power module according to claim 1, wherein the cradle includes a base supporting a bottom of the housing, a rear portion projecting upward from the base, and a top portion extending from the rear portion parallel to the base, and wherein the rear portion of the cradle is coupled to the mounting bracket.

5. The auxiliary power module of claim 4 further comprising wheels attached to a bottom of the base to allow the housing to be grounded.

6. The auxiliary power module of claim 4, wherein the top portion includes a quick connect coupler for mating with a quick connect coupler on a hose to mount the hose during transit.

7. The auxiliary power module of claim 4, wherein the top portion includes at least one eye bolt that extends upward from the top portion for connecting the cradle to the moveable arm.

8. The auxiliary power module according to claim 1, further including a flow control valve for controlling the flow rate of the fluid entering the hydraulic motor.

9. The auxiliary power module according to claim 1, further including a heat exchanger connected to the hydraulic motor through a hydraulic circuit.

10. The auxiliary power module according to claim 9, further including a fan driven by the hydraulic motor, wherein the fan is configured to blow air over the heat exchanger to cool the fluid in the hydraulic circuit.

11. The auxiliary power module according to claim 1, further including a controller configured to control speed of the prime mover powering the auxiliary power module, control displacement of the hydraulic pump supplying fluid to the hydraulic motor, and/or control one or more flow control valves for controlling flow of fluid to the hydraulic motor and/or auxiliary power device.

12. The auxiliary power module according to claim 1, further including a protective barrier at least partially surrounding the auxiliary power device for protecting the auxiliary power device from impact during storage/transportation.

13. The auxiliary power module according to claim 1, further including one or more guide rails extending vertically from the housing.

14. The auxiliary power module according to claim 1, wherein the auxiliary power device includes a voltage selector for switching among multiple voltage levels.

15. The auxiliary power module according to claim 1, further including a fire suppression system contained within the housing.

16. The auxiliary power module according to claim 1, further including a connector for receiving an electrical umbilical cable connected to the mobile platform, the connector serving as a single point of connection for auxiliary power device control, fault diagnostic and handling, start/stop control, and/or two way communication between the mobile platform and the auxiliary power device.

17. A power source including:
  a prime mover mounted on a mobile platform;
  a hydraulic pump on the mobile platform that is driven by the prime mover and supplies hydraulic fluid to body hydraulics of the mobile platform for work or propulsion functions during typical operation of the mobile platform;
  a first quick connect coupler fluidly connected to the hydraulic pump;
  a hose having first and second ends and a second quick connect coupler on the first end for mating with the first quick connect coupler connected to the hydraulic pump;
  an auxiliary power module removably connected to the mobile platform, the auxiliary power module including:
  a hydraulic motor;
  a generator mechanically driven by the hydraulic motor; and
  a fluid connector fluidly connected to the hydraulic motor through a hydraulic circuit and configured to mate with a fluid connector on the second end of the hose to fluidly connect the hydraulic motor to the hydraulic pump, wherein the auxiliary power module is configured to be demountable from the mobile platform when the fluid connector is disconnected from the fluid connector on the second end of the hose, the auxiliary power module being contained as a unit within a housing when the auxiliary power module is demounted from the mobile platform; and
  a mounting system for coupling the auxiliary power module to the mobile platform, the mounting system including:
  a cradle for supporting the auxiliary power module, and
  a mounting bracket configured to be coupled to the mobile platform and to the cradle to secure the auxiliary power module to the mobile platform, the mounting bracket including a moveable arm for enabling raising, lowering, and supporting of the cradle supporting the auxiliary power module.

18. The power source according to claim 17, wherein the cradle includes a base supporting a bottom of the housing, a rear portion projecting upward from the base, and a top portion extending from the rear portion parallel to the base, and wherein the rear portion of the cradle is coupled to the mounting bracket.

19. The power source according to claim 18, wherein the top portion includes a quick connect coupler for mating with a quick connect coupler on the hose to mount the hose during transit, and at least one eye bolt that extends upward from the top portion for connecting the cradle to the moveable arm.

20. An auxiliary power module removably connectable to a mobile platform to be powered by a prime mover mounted on the mobile platform, wherein the mobile platform includes a power take-off, the auxiliary power module including:
  a housing;
  at least one generator contained within the housing;
  at least one hydraulic pump contained within a housing and configured to be driven by the prime mover; through the power take-off; and
  at least one hydraulic motor contained within the housing, fluidly connected to the hydraulic pump through a hydraulic circuit, and mechanically connected to the generator for driving the generator, wherein the auxiliary power module is configured to be demountable from the mobile platform when the hydraulic pump is disconnected from the power take-off on the mobile platform, the auxiliary power module being contained as a unit within the housing when the auxiliary power module is demounted from the mobile platform; and
  a mounting system for coupling the auxiliary power module to the mobile platform, the mounting system including:
  a cradle for supporting the auxiliary power module, and
  a mounting bracket configured to be coupled to the mobile platform and to the cradle supporting the auxiliary power module to the mobile platform, the mounting bracket including a moveable arm for enabling raising, lowering, and supporting of the cradle supporting the auxiliary power module.

* * * * *